United States Patent
Mrsic-Flogel et al.

(10) Patent No.: US 7,565,210 B2
(45) Date of Patent: Jul. 21, 2009

(54) DATA COMMUNICATIONS

(75) Inventors: Janko Mrsic-Flogel, London (GB); Derek Martin Reynolds, Plan-Les-Ouates (CH); Zorislav Sojat, Zagreb (HR); Marco Bianchessi, Agrate Brianza MI (IT); Stefano Sala, Milan (IT)

(73) Assignee: STMicroelectronic Srl., Amsterdam (NL)

( * ) Notice: Subject to any disclaimer, the term of this patent is extended or adjusted under 35 U.S.C. 154(b) by 93 days.

(21) Appl. No.: 11/640,804

(22) Filed: Dec. 18, 2006

(65) Prior Publication Data

US 2007/0101011 A1 May 3, 2007

Related U.S. Application Data

(63) Continuation of application No. 10/915,956, filed on Aug. 11, 2004, now abandoned, which is a continuation of application No. 10/705,260, filed on Nov. 10, 2003, now abandoned, which is a continuation of application No. 10/389,705, filed on Mar. 12, 2003, now abandoned, which is a continuation of application No. PCT/GB01/04099, filed on Sep. 13, 2001.

(30) Foreign Application Priority Data

Sep. 13, 2000 (GB) ................... 0022474.1

(51) Int. Cl.
| | |
|---|---|
| G05B 15/00 | (2006.01) |
| G05B 11/00 | (2006.01) |
| G05B 19/18 | (2006.01) |
| G06F 9/44 | (2006.01) |
| G06F 9/45 | (2006.01) |
| G06F 15/16 | (2006.01) |

(52) U.S. Cl. .................. 700/19; 700/1; 700/20; 700/65; 700/66; 717/106; 717/121; 717/122; 717/140; 709/217; 709/218; 709/219; 709/230

(58) Field of Classification Search ............ 700/17–20, 700/83, 1, 9, 65–66, 86–88; 717/106, 121–122, 717/140; 709/217–219, 230
See application file for complete search history.

(56) References Cited

U.S. PATENT DOCUMENTS

| 5,909,183 A * | 6/1999 | Borgstahl et al. ...... 340/825.22 |
| 6,008,814 A | 12/1999 | Baldwin et al. |
| 6,026,437 A | 2/2000 | Muschett et al. |
| 6,035,330 A | 3/2000 | Astiz et al. |

(Continued)

FOREIGN PATENT DOCUMENTS

EP        0 940 959        9/1999

(Continued)

*Primary Examiner*—Ronald D Hartman, Jr.
(74) *Attorney, Agent, or Firm*—Knobbe Martens Olson & Bear, LLP

(57) ABSTRACT

The present invention provides methods of, computer programs for and apparatus for control and/or observation of a device with communication capabilities by a controller device with hypertext or hypermedia communication capabilities. More particularly, but not exclusively, the present invention relates to methods of, computer programs for and apparatus for control and observation of a consumer electronics device with communications capability from a mobile controller device with hypertext or hypermedia communications capability over a proximity bearer.

5 Claims, 11 Drawing Sheets

U.S. PATENT DOCUMENTS

| | | | |
|---|---|---|---|
| 6,157,943 A * | 12/2000 | Meyer | 709/203 |
| 6,237,030 B1 | 5/2001 | Adams et al. | |
| 6,314,448 B1 | 11/2001 | Conner et al. | |
| 6,324,500 B1 | 11/2001 | Amro et al. | |
| 6,334,145 B1 | 12/2001 | Adams et al. | |
| 6,353,853 B1 * | 3/2002 | Gravlin | 709/219 |
| 6,370,141 B1 * | 4/2002 | Giordano et al. | 370/386 |
| 6,374,079 B1 * | 4/2002 | Hsu | 455/11.1 |
| 6,453,687 B2 * | 9/2002 | Sharood et al. | 62/127 |
| 6,615,088 B1 * | 9/2003 | Myer et al. | 700/20 |
| 6,850,149 B2 * | 2/2005 | Park | 340/7.1 |
| 6,891,838 B1 * | 5/2005 | Petite et al. | 370/401 |
| 7,058,626 B1 | 6/2006 | Pan et al. | |
| 7,187,986 B2 * | 3/2007 | Johnson et al. | 700/17 |
| 2005/0113991 A1 | 5/2005 | Rogers et al. | |

FOREIGN PATENT DOCUMENTS

| | | |
|---|---|---|
| WO | WO 97/18636 | 5/1997 |
| WO | WO 01/20572 | 3/2001 |

\* cited by examiner

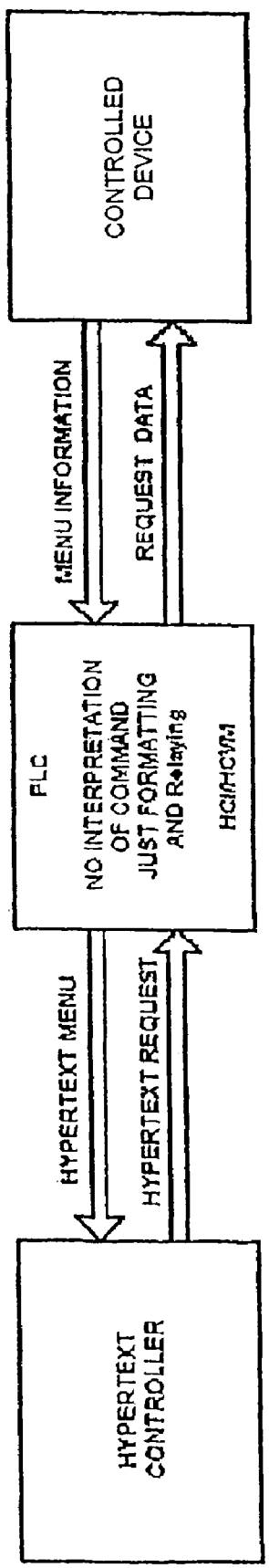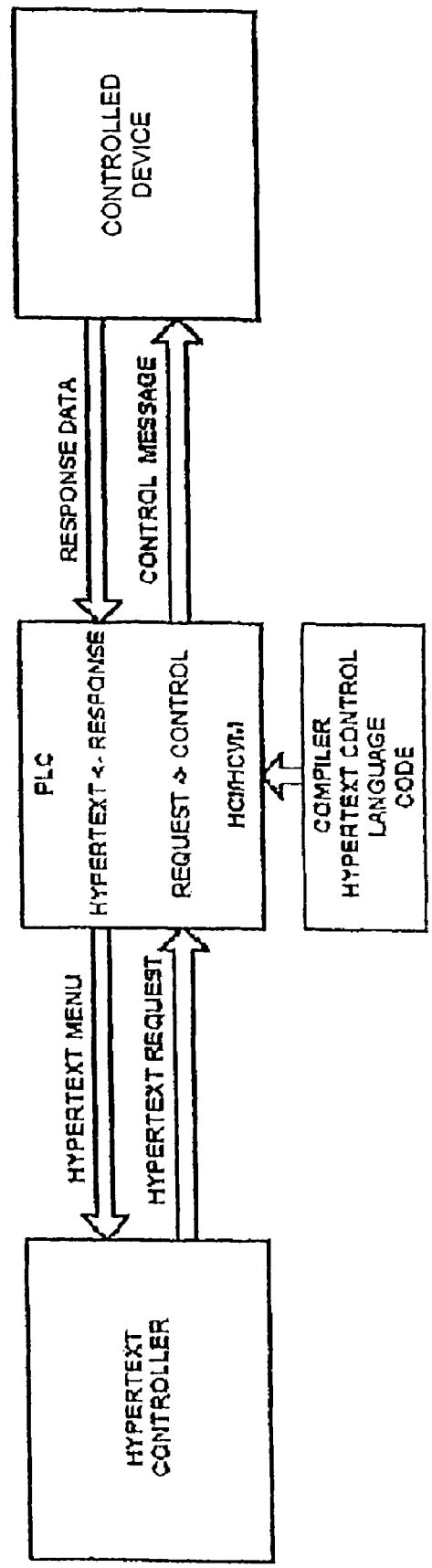
Figure 4a
Figure 4b

Figures 8a to f
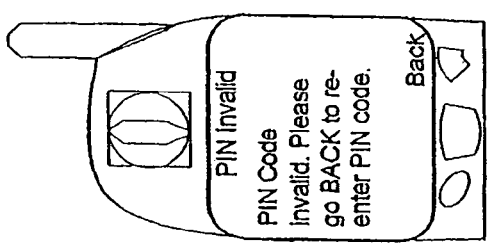
Figure 8c
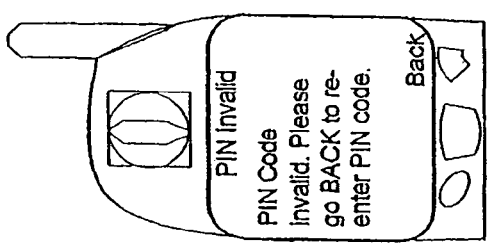
Figure 8f
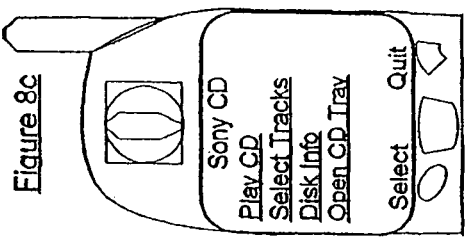
Figure 8b
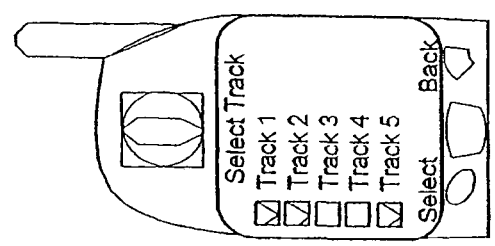
Figure 8e
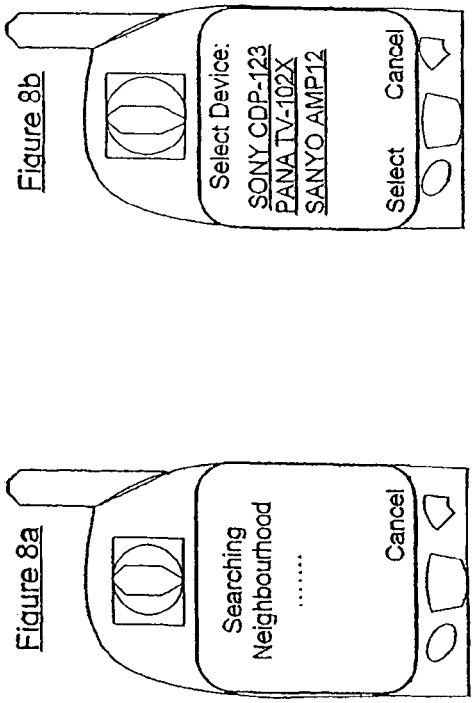
Figure 8a
Figure 8d

Figures 8g to l

DATA COMMUNICATIONS

RELATED APPLICATIONS

This application is a continuation application, and claims the benefit under 35 U.S.C. §120 of application Ser. No. 10/915,956 filed on Aug. 11, 2004, now abandoned, which is hereby incorporated by reference herein. Application Ser. No. 10/915,956 also claimed the benefit under 35 U.S.C. § 120 of application Ser. No. 10/705,260 filed on Nov. 10, 2003, now abandoned, which is hereby incorporated by reference herein. Application Ser. No. 10/705,260 also claimed the benefit under 35 U.S.C. § 120 of application Ser. No. 10/389,705 filed on Mar. 12, 2003, now abandoned, which is hereby incorporated by reference herein. Application Ser. No. 10/389,705 also claimed the benefit under 35 U.S.C. §§ 120 and 365 of PCT application No. PCT/GB01/04099 filed on Sep. 13, 2001, which is hereby incorporated by reference herein.

BACKGROUND OF THE INVENTION

1. Field of the Invention

The present invention relates to methods of, computer programs for and apparatus for control and/or observation of a device with communication capabilities by a controller device with hypertext or hypermedia communication capabilities. More particular, but not exclusively, the present invention relates to methods of, computer programs for and apparatus for control and observation of a consumer electronics device with communications capability from a mobile controller device with hypertext or hypermedia communications capability over a proximity bearer.

2. Description of the Related Technology

Techniques of remotely controlling consumer electronics devices, such as CD players are known. Conventional remote controllers are device-specific and factory-programmed—i.e. pre-programmed in an unchangeable way—to operate the particular device. Typically, such remote controllers will have keypads with buttons which, when pressed, will instruct the device to perform a particular function. Often, the remote controller will communicate with the device using Infra Red Data Association (IrDA) as the bearer medium and both the controller and the device will have IrDA communications hardware and software entities—i.e. IrDA transmitters and/or receivers, and IrDA protocol stacks. Most remote controllers have a one-way communication relationship with the device they control. Thus, instructions are sent from the remote controller to the device but data is not sent from the device back to the remote controller.

FIG. 1 is a schematic diagram showing the one-way flow of control data from the controller side (i.e. a remote controller) to the controlled side (i.e. the consumer electronics device) according to the prior art.

Controllers with two-way communications relationships with devices are known. For example, Sony™ have developed remote controllers which are factory-programmed for Sony™ devices but which have the capability of receiving status information from those devices and displaying it to a user on a display screen on the remote controller.

User-programmable remote controllers are also known. For example, the Philips Pronto™ and the Marantz™ RC500. Typically, user-programmable remote controllers are factory-programmed for particular devices but may be re-programmed by a user to function as remote controllers for new devices by either learning the control messages used by a device-specific factory-programmed remote controller (i.e. by pointing the factory-programmed remote controller IrDA transmitter at an IrDA receiver of the re-programmable controller which learns the control messages parasitically as the user exercises the control options available on the factory-programmed controller), or by connecting the re-programmable controller to a computing device, such as a personal computer (PC) and downloading control programs pre-configured for the new device from the Internet.

Consumer electronics devices connected to the Internet are known. For example, microwave ovens are known which may be connected to the Internet using a modem and the public switched telephone network (PSTN) for downloading cooking settings. Also, vending machines, such as Coke™ vending machines, are known which have connection to a data network and which include a server, such as a finger daemon server, for remote interrogation by a client device also connected to the data network. This may be used by a user of the remote client device to find out whether the Coke™ machine has any cans available for vending without the user needing to physically go to the machine.

One problem with the above-described approach to controlling devices is that the controller is typically specific to a particular device or a set of particular devices and must be pre-programmed (either by the manufacturer or the user) with all the capabilities of the controlled device that the user wishes to control. Another problem with the above-described approaches to controlling devices is that the method of control is unreliable. For example, one-way remote controllers have no way of determining whether a user instruction has been properly received by the device. This is particularly the case with IrDA remote controllers which require line of sight to the device. Furthermore, with two-way communication between remote controller and device, reliability can be even more of a problem. For example, where the remote controller maintains state relating to the operational status of the device, the unreliability of communicating commands to the device and the unreliability of receiving status from the device means that the state maintained in the remote controller may not be synchronised with the actual state of the device.

One problem with the above described approach to receiving status information at a controller device from a controlled device is that the controlled device must have knowledge of the capabilities of the controller device—for example, the display capabilities of the controller device.

SUMMARY OF CERTAIN INVENTIVE ASPECTS OF THE INVENTION

According to a first aspect of the present invention, there is provided a method of providing a remote data processing device with control data, the control data enabling a user to control the operation of a consumer electronics device, both the remote data processing device and the consumer electronics device being capable of communication using a hypermedia data communications protocol, the method comprising the following steps:

a) the consumer electronics device generating a hypermedia data message, the hypermedia data message comprising data representing one or more menu options, the menu options corresponding to one or more actions capable of being performed by the consumer electronics device in response to receiving a control message corresponding to one or more of the menu options;

b) the consumer electronics device sending the hypermedia data message to the remote data processing device using the hypermedia data communications protocol.

According to a second aspect of the present invention, there is provided a method of providing a remote data processing device with data representing the operational state of a consumer electronics device, both the remote data processing device and the consumer electronics device being capable of communication using a hypermedia data communications protocol, the method comprising the following steps:

a) the consumer electronics device generating a hypermedia data message in dependence on the operational state of the consumer electronics device; and b) sending the hypermedia data message to the remote data processing device using the hypermedia data communications protocol.

According to a third aspect of the present invention, there is provided a method of controlling a consumer electronics device using a remote data processing device, both the remote data processing device and the consumer electronics device being capable of communication using a hypermedia data communications protocol, the method comprising the following steps:

a) the consumer electronics device generating a hypermedia data message, the hypermedia data message comprising data representing one or more menu options, the menu options corresponding to one or more actions capable of being performed by the consumer electronics device in response to receiving a control message corresponding to one or more of the menu options;

b) the consumer electronics device sending the hypermedia data message to the remote data processing device using the hypermedia data communications protocol;

c) the remote data processing device presenting the one or more menu options to a user via a man-machine interface;

d) the user selecting one or more of the menu options using the man-machine interface;

e) the remote data processing device generating and sending to the consumer electronics device a control message in response to the user selection;

f) the consumer electronics device performing the corresponding action or actions in response to the received control message.

According to a fourth aspect of the present invention, there is provided a consumer electronics device adapted to provide a remote data processing device with control data, the control data enabling a user to control the operation of the consumer electronics device, the consumer electronics device being capable of communication using a hypermedia data communications protocol, the consumer electronics device comprising the following:

a) means for generating a hypermedia data message, the hypermedia data message comprising data representing one or more menu options, the menu options corresponding to one or more actions capable of being performed by the consumer electronics device in response to receiving a control message corresponding to one or more of the menu options;

b) means for sending the hypermedia data message to the remote data processing device using the hypermedia data communications protocol.

According to a fifth aspect of the present invention, there is provided a consumer electronics device adapted to provide a remote data processing device with data representing its operational state, the consumer electronics device being capable of communication using a hypermedia data communications protocol, the consumer electronics device comprising the following:

a) means for generating a hypermedia data message in dependence on its operational state; and b) means for sending the hypermedia data message to the remote data processing device using the hypermedia data communications protocol.

According to a sixth aspect of the present invention, there is provided a consumer electronics device adapted to be controlled using a remote data processing device, the consumer electronics device being capable of communication using a hypermedia data communications protocol, the consumer electronics device comprising the following:

a) means for generating a hypermedia data message, the hypermedia data message comprising data representing one or more menu options, the menu options corresponding to one or more actions capable of being performed by the consumer electronics device in response to receiving a control message corresponding to one or more of the menu options;

b) means for sending a hypermedia data message to the remote data processing device using the hypermedia data communications protocol;

c) means for receiving a control message from the remote data processing device using the hypermedia data communications protocol;

d) means for performing one or more actions in response to a received control message.

According to a seventh aspect of the present invention, there is provided a control unit for a consumer electronics device, the control unit being adapted to provide a remote data processing device with control data, the control data enabling a user to control the operation of the consumer electronics device, the control unit comprising:

a) means for determining the operational state of the consumer electronics device;

b) means for generating a hypermedia data message, the hypermedia data message comprising data representing one or more menu options, the menu options corresponding to one or more actions capable of being performed by the consumer electronics device;

c) means for sending the hypermedia data message to the remote data processing device using a hypermedia data communications protocol.

According to an eighth aspect of the present invention, there is provided a control unit for a consumer electronics device, the control unit being adapted to provide a remote data processing device with data representing its operational state, the control unit comprising the following:

a) means for determining the operational state of the consumer electronics device;

b) means for generating a hypermedia data message in dependence on its operational state; and c) means for sending the hypermedia data message to the remote data processing device using a hypermedia data communications protocol.

According to a ninth aspect of the present invention, there is provided a control unit for a consumer electronics device, the control unit comprising the following:

a) means for generating a hypermedia data message, the hypermedia data message comprising data representing one or more menu options, the menu options corresponding to one or more actions capable of being performed by the consumer electronics device in response to receiving one or more control messages corresponding to one or more of the menu options;

b) means for sending the hypermedia data message to a remote data processing device using a hypermedia data communications protocol;

c) means for receiving a control message from a remote data processing device;

d) means for controlling the consumer electronics device to perform one or more actions in response to a received control message.

According to a tenth aspect of the present invention, there is provided an integrated circuit for a consumer electronics device comprising:

a) communications means adapted to communicate using a proximity bearer;

b) microprocessor control unit means;

c) interface means for electronic communication with a controller of the consumer electronics device.

According to an eleventh aspect of the present invention, there is provided a data processing device comprising proximity bearer communications means and hypermedia transport protocol message generation means, wherein the device is adapted to communicate with remote data processing devices using the hypermedia transport protocol over the proximity bearer.

According to a twelfth aspect of the present invention, there is provided a method of controlling a consumer electronics device, the consumer electronics device being capable of communicating using a hypermedia data communications protocol over a proximity bearer, the method comprising the following steps:

a) the consumer electronics device receiving a hypermedia request message;

b) the consumer electronics device determining one or more actions to be performed by the consumer electronics device, the determining being performed in dependence on the hypermedia request message;

c) the consumer electronics device performing the one or more actions.

According to a thirteenth aspect of the present invention, there is provided a method of compiling a computer program into a machine code program, the computer program being written in a programming language, the programming language having native functions or methods for causing the interrogation of electronic input/output interfaces and having native functions or methods for causing the generation of menu option descriptions for inclusion in hypermedia data messages.

According to a fourteenth aspect of the present invention, there is provided a method of controlling a controlled data processing device using a controller data processing device, the controlled device and controller device both being capable of communication using a hypermedia data communications protocol, the method comprising the following steps:

a) the controlled device sending a hypermedia data message to the controller device using the hypermedia protocol, the hypermedia data message comprising one or more hyperlinks;

b) the controller device presenting the hypermedia data message to a user of the controller device using a man-machine interface of the controller device;

c) the user selecting one or more of the one or more hyperlinks using the man-machine interface;

d) in response to the user selection, the controller device sending a hypermedia request message to the controlled device using the hypermedia protocol; and e) the controlled device performing an action in response to the hypermedia request message received.

According to a fifteenth aspect of the present invention, there is provided a method of controlling a controlled data processing device using a controller data processing device, the controlled device being capable of communication using a data communications protocol, the controller device being capable of communication using a hypermedia data communications protocol, the method comprising the following steps:

a) the controlled device sending a data message to a mediating data processing device using the data communications protocol, the mediating device being capable of communication using both the data communications protocol and the hypermedia data communications protocol, b) in response to the data message received, the mediating device sending a hypermedia data message to the controller device using the hypermedia data communications protocol, the hypermedia message comprising one or more hyperlinks;

c) the controller device presenting the hypermedia data message to a user of the controller device using a man-machine interface of the controller device;

d) the user selecting one or more of the one or more hyperlinks using the man-machine interface;

e) in response to the user selection, the controller device sending a hypermedia request message to the mediating device using the hypermedia data communications protocol;

f) in response to the hypermedia request message received, the mediating device sending a control data message to the controlled device using the data communications protocol; and g) the controlled device performing an action in response to the control data message received.

According to a sixteenth aspect of the present invention, there is provided a method of receiving status information from a consumer electronics device at a remote data processing device, the consumer electronics device and remote device both being capable of communication using a hypermedia data communications protocol over a proximity bearer, the method comprising the following steps:

a) the consumer electronics device sending a hypermedia data message to the remote device using the hypermedia protocol over the proximity bearer, the hypermedia data message comprising data representing the state of the consumer electronics device;

b) the remote device receiving the hypermedia data message using the hypermedia data communications protocol over the proximity bearer; and c) the remote device presenting the hypermedia data message to a user of the remote device using a man-machine interface of the controller device.

According to a seventeenth aspect of the present invention, there is provided a method of receiving status information from a consumer electronic device at a remote data processing device, the remote data processing device being capable of communication using a hypermedia data communications protocol over a proximity bearer, the consumer electronics device being capable of communication using a data communications protocol, the method comprising the following steps:

a) the consumer electronics device sending a data message to a mediating data processing device using the data communications protocol, the mediating data processing device being capable of communication using both the data communications protocol and the hypermedia data communications protocol, data message comprising data representing the state of the consumer electronics device, the data message comprising data representing the state of the consumer electronics device;

b) in response to the data message received, the mediating device sending a hypermedia data message to the remote device using the hypermedia data communication protocol over the proximity bearer, the hypermedia data message comprising data representing the state of the consumer electronics device;

c) the remote device receiving the hypermedia data message using the hypermedia data communications protocol over the proximity bearer; and d) the remote device presenting the hypermedia data message to a user of the remote device using a man-machine interface of the controller device.

Further aspects of the present invention are set out in the appended claims.

One advantage of the present invention is that it facilitates control and/or observation of controlled devices without the controller device needing to have any prior knowledge or expectations of the capabilities of the controlled device, save that it is capable of hypermedia communication with the controller device. Thus, the controller device need not be pre-programmed with device-specific information either by a user or manufacturer as has been the case according to the prior art described above.

Another advantage of the present invention is that the control and/or observation communication between a controller device and a controlled is reliable and any controlled device operational state maintained by the controller device will be reliably synchronised with the actual operational state of the controlled device.

Another advantage of the present invention is that the controller device need not store data enabling the control and/or observation of the controlled device permanently or for as long as required by prior art systems described above.

Another advantage of the present invention is that the controller device need not store data enabling the control and/or observation of the controlled device in a manner which are currently not valid due to the operational state of the controlled device as required by prior art systems described above. For example, the controller device will not store data enabling the control of a controlled CD player to stop playing a CD when the CD player is not currently playing a CD.

There now follows, by way of example only, a detailed description of the present invention in which:

BRIEF DESCRIPTION OF THE DRAWINGS

FIGS. 4a) and b) are schematic diagrams showing interactions between a remote controller and a controlled device according to embodiments of the present invention;

DETAILED DESCRIPTION OF CERTAIN EMBODIMENTS OF THE INVENTION

By way of a brief overview, the present invention (sometimes referred to as the Hypertext or Hypermedia Control System or HCS) provides a system for control and/or observation of a controlled device, such as a consumer electronics device, by a controller, such as a WAP-enabled mobile phone, in which the controller need not have any prior knowledge or expectations of the capabilities, or even the presence of the controlled device. The controller is essentially stateless and has not been programmed either by the manufacturer or the user of the controlled device. Similarly, the controlled device has no pre-configured knowledge or expectations of the controller. However, the controller and the controlled device are both able to communicate using a hypermedia protocol, such as the Hypertext Transfer Protocol (HTTP) or the Wireless Transfer Protocol (WTP). Typically, but not necessarily, the controller and the controlled device will communicate over a proximity bearer (PB) such as Bluetooth™ (BT).

Figure 1:
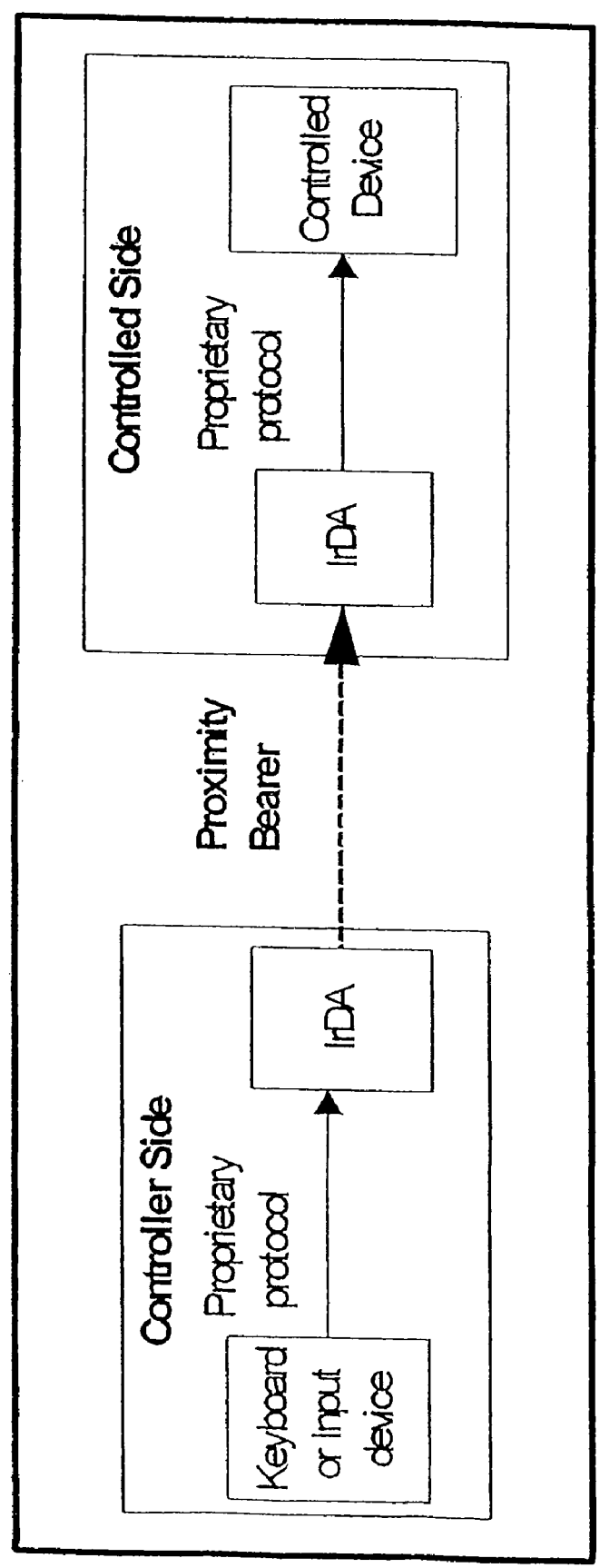
FIG. 1 is a schematic diagram showing the flow of control data in a remote control arrangement according to the prior art.
Figure 2:
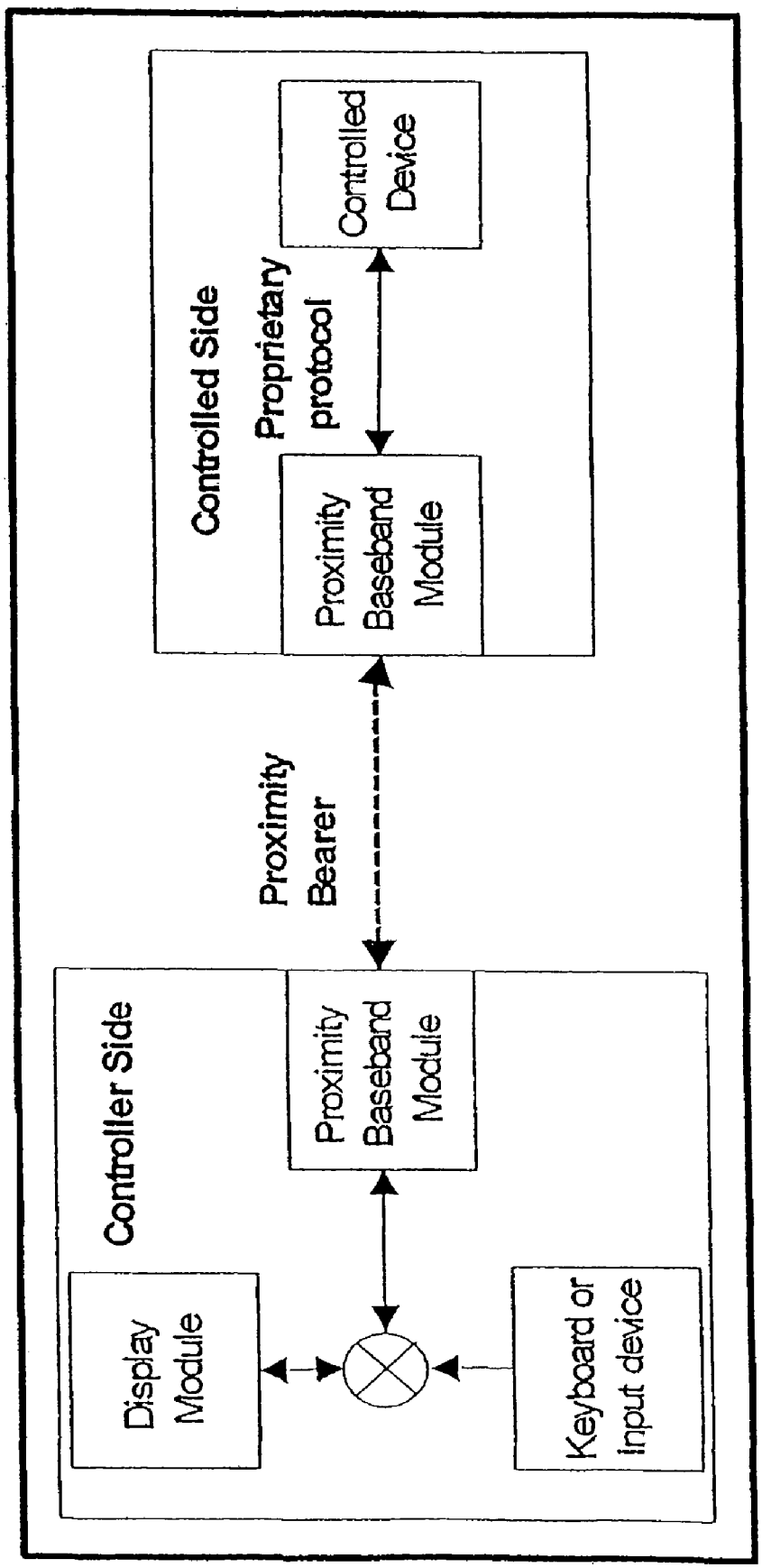
FIG. 2 is a schematic diagram showing the flow of control data in a remote control arrangement according to an embodiment of the present invention.

FIG. 2 is a schematic diagram showing the flow of control data in a remote control arrangement according to an embodiment of the present invention in which it is shown that data may flow from the controlled side to the controller side as well as from the controller side to the controlled side. Data flowing from the control side to the controller side may include data representing the operational status of the controlled device and/or data for programming the controller device to enable it to send control data to the controlled device for controlling the controlled device.

Figure 3A:
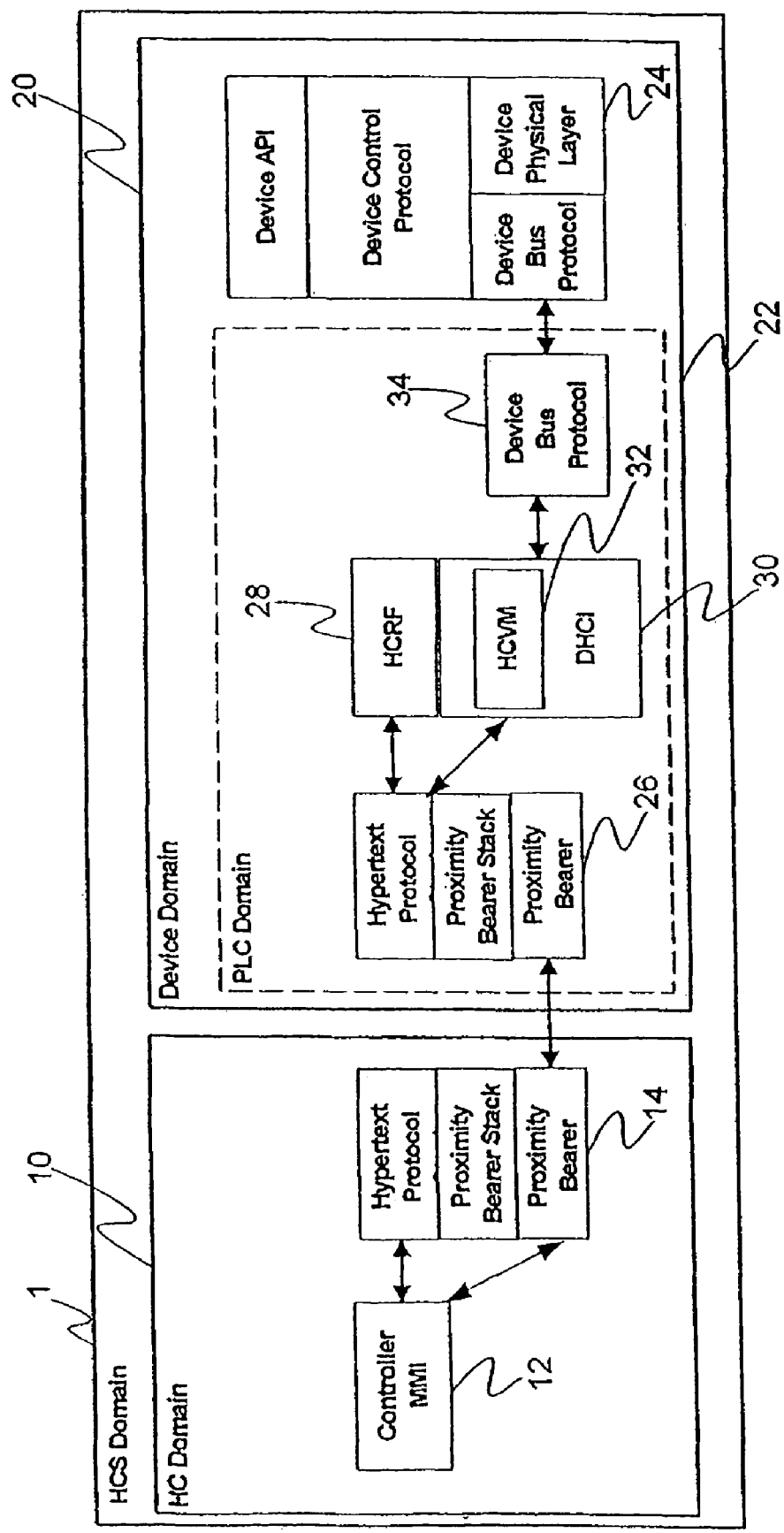
FIGS. 3a) and b) are schematic diagrams showing the system architecture of a remote controller and controlled device according to embodiments of the present invention.

FIG. 3a) is a schematic diagram showing the system architecture of a remote controller and controlled device according to an embodiment of the present invention. Domain 1 is the hypermedia control system domain incorporating a hypermedia controller domain 10 and a device domain 20. The hypermedia controller domain may correspond to a data processing device such as a mobile phone or a personal digital assistant (PDA), or any other data processing device whether fixed or mobile. The hypermedia control domain 10 comprises a controller man-machine interface (MMI) 12 such as a screen and a keypad and a hypermedia protocol stack, proximity bearer stack and proximity bearer equipment 14. Typically, the hypermedia control domain device will operate a hypermedia application such as a Web or WAP browser application. They hypermedia control domain device may receive hypermedia data messages and send hypermedia request messages or other request messages using protocol and bearer stack 14. The device domain 20 comprises a proximity link controller (PLC) domain 22 and a device controller domain 24. The PLC domain 22 comprises a hypermedia protocol stack, proximity bearer stack and proximity bearer equipment 26 corresponding to the controller-side stack and bearer arrangement 14. The device domain is able to receive hypertext request messages or other control messages using stack and bearer arrangement 26, in particular it is able to receive such messages from the hypermedia control domain device. Messages received are filtered using hypermedia control request filter (HCRF) 28 which filters hypermedia request messages to device hypertext control interpreter (DHCI) 30. DHCI 30 is a computer program or microcoded sub-system that interprets hypermedia requests using hypermedia control virtual machine (HCVM) 32 itself a computer program or microcoded sub-system. The combination of DHCI 30 and HCVM 32 is able to interpret hypertext request messages received as control messages for controlling the controlled device. This is achieved by passing control messages to device controller domain 24 using device bus protocol 34. Preferably, the PLC is arranged to communicate using two or more hypermedia protocols such as WAP, Web, iMode etc. so that control is possible using controller devices capable of communicating using any one of the hypermedia protocols.

Thus, a hypermedia control device is able to control a remote device, such as a consumer electronics device, using a hypertext data communications protocol over a proximity bearer. In other embodiments of the present invention, the controller device is able to control the control device using the proximity bearer alone. In other embodiments of the present invention, the controller device and the controlled device communicate using a link level communications bearer other than a proximity bearer. For example, they may communicate using physical cabling or another data communications network such as an Internet protocol network or a public switched telephone network or a cellular network.

The combination of HCVM 32 and DHCI 30 are also arranged to be capable of interrogating the device controller 24 to receive data representing the operational status of the controlled device. Using this data, HCVM 32 and DHCI 30 are able to generate hypermedia data messages comprising data representing the operational state of the control device and sending these data messages to the controller device using the stack and bearer arrangement 26. Upon receipt of the hypermedia data messages using stack and bearer arrangement 14, the controller device is able to display the hypermedia data message to a user of the controller device using the MMI 12. For example, the controller device may display a Web page or a WAP card or deck to the user via a browser application. Thus, the control device is able to present data representing the operational state of the device to a user of a remote controller device in the form of a hypermedia data message.

Furthermore, the hypermedia data messages generated by the controlled device may include hyperlinks or other menu options which, when presented to a user of the controller device, may be selected or activated by the user thereby causing the controller device to generate a hypertext request message or other control message for sending to the control device and thereby controlling the controlled device as has been described above. These hyperlinks or menu options may represent the currently available actions that may be performed by the control device. For example, if the control device is a CD player and the CD player is currently playing a CD, then a hyperlink or menu option for stopping the CD player may be included in the hypermedia data message, but not a hyperlink or menu option for starting the CD player to play a CD.

Thus, it can be seen that the control device arrangement as shown in FIG. 3a) is able to provide a controller device with both its operational status and data enabling the controller device to control the controlled device.

Figure 3B:
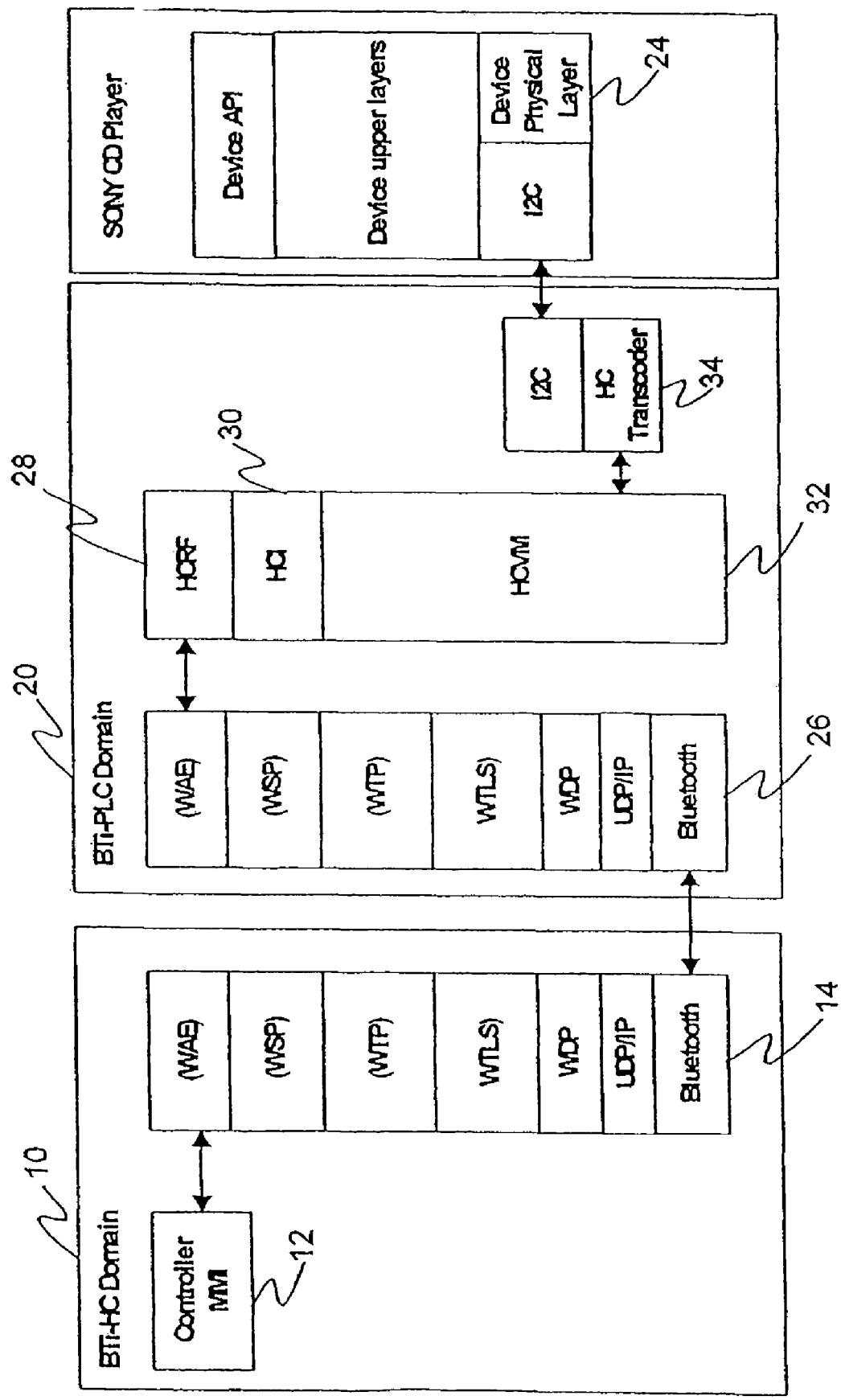

FIG. 3b) is a schematic diagram showing the system architecture of a remote controller and control device according to an embodiment of the present invention, as described in general with reference to FIG. 3a) above. FIG. 3b) shows a particular embodiment in which the stack and bearer arrangements 14 and 26 are WAP over BT stack and bearer arrangements and the device bus protocol 34 and device controller 24 use the I2C protocol.

FIGS. 4a) and 4b) are schematic diagrams showing interactions between the remote controller and the control device according to embodiments of the present invention. FIG. 4a) shows one embodiment of the present invention in which the PLC merely formats and relays hypermedia request messages received from the controller device for passing to the controller of the controlled device for obtaining status or controlling the control device. Similarly, the PLC merely formats and relays status information received from the control device as hypertext data message for sending to the controller device. FIG. 4b) shows an alternative embodiment in which the PLC interprets hypermedia request messages received from the controller device using a compiled control program code specific to the controlled device and generates a control message for controlling or interrogating the controlled device. Similarly, operational status data from the controlled device is interpreted and used to generate a hypertext data message for sending to the controller device. The compiled hypertext control language code used in the embodiment described with reference to FIG. 4b) is executed by the HCVM and controls the interaction between the controller device and the controlled device. The compiled code is compiled from a source program written in a programming language which has functions or methods for interrogating a controlled device via a controller interface to obtain the operational status of the controlled device and functions and methods for issuing commands to the controlled device via a controller interface. The language also has functions or methods for causing the generation of hypertext data messages comprising data representing the operational state of the controlled device and/or comprising data enabling the controller device to control the controlled device as described above.

The compiled code is executed by the HCVM, but the HCVM does not itself have the ability to generate hypermedia data messages. This is left to the DHCI which functions as a wrapper to the HCVM and generates hypermedia data messages in response to instructions received from the HCVM. This is the case in both embodiments described with reference to FIGS. 4a) and 4b).

Figure 5:
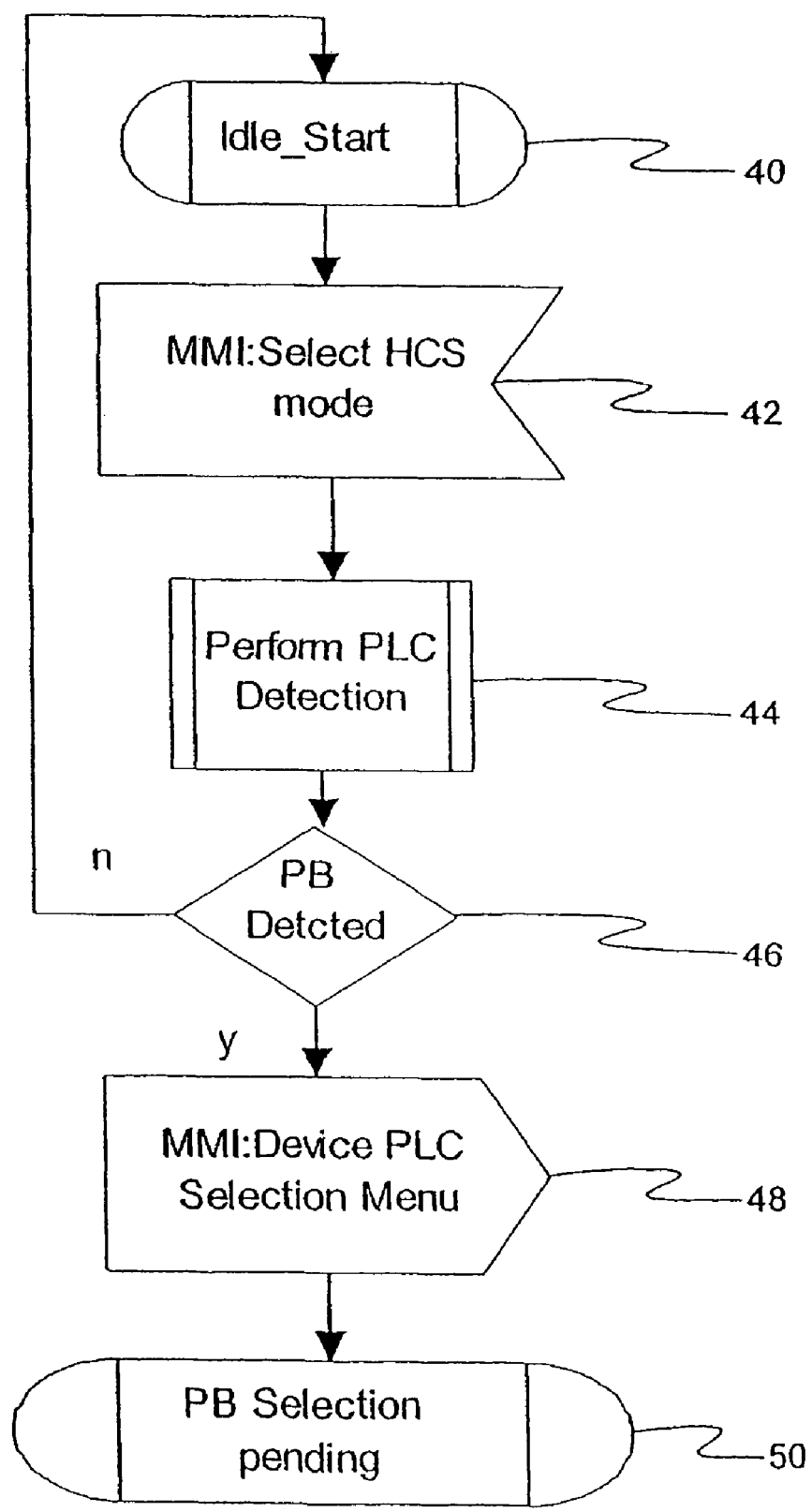
FIGS. 5, 6 and 7 are flow diagrams showing the initial and subsequent detection procedures for establishing communications links between controlled devices and controller devices according to embodiments of the present invention.
Figure 6:
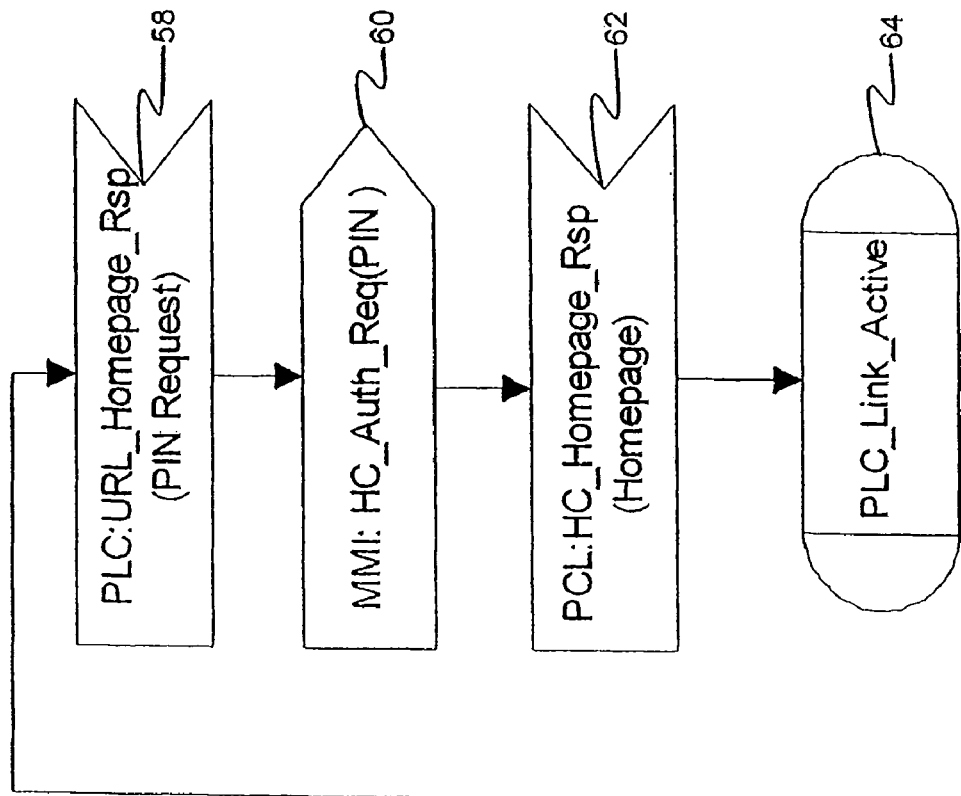
Figure 6:
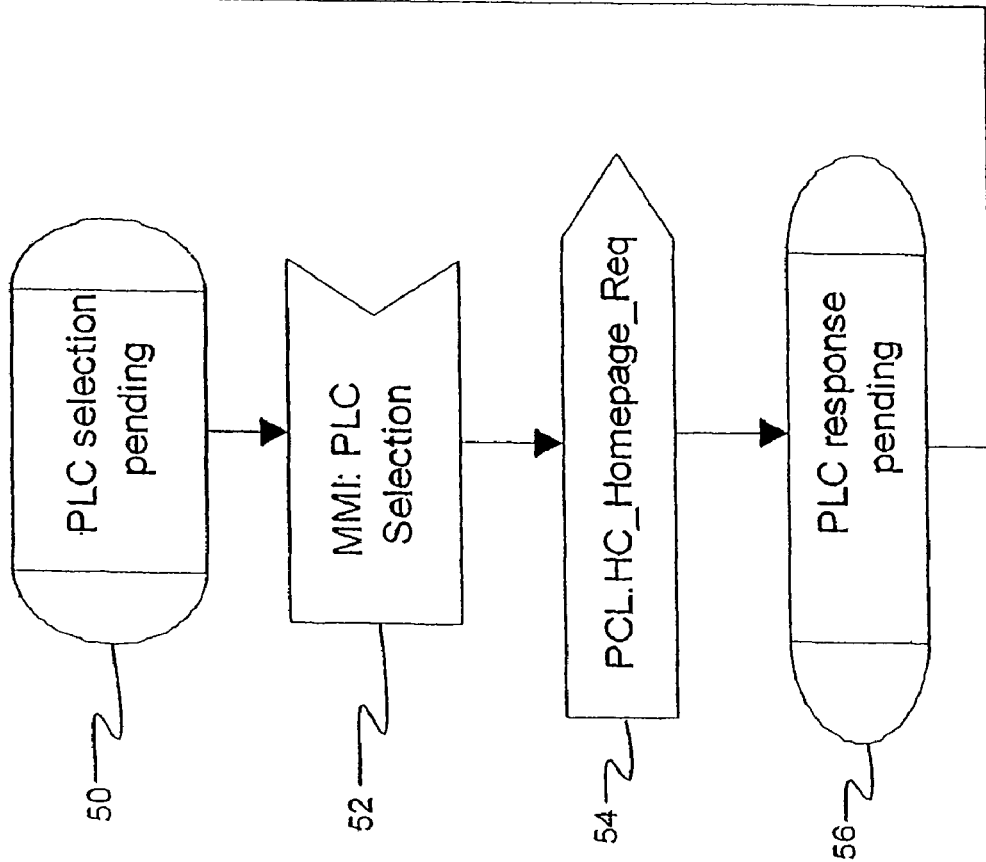
Figure 7:
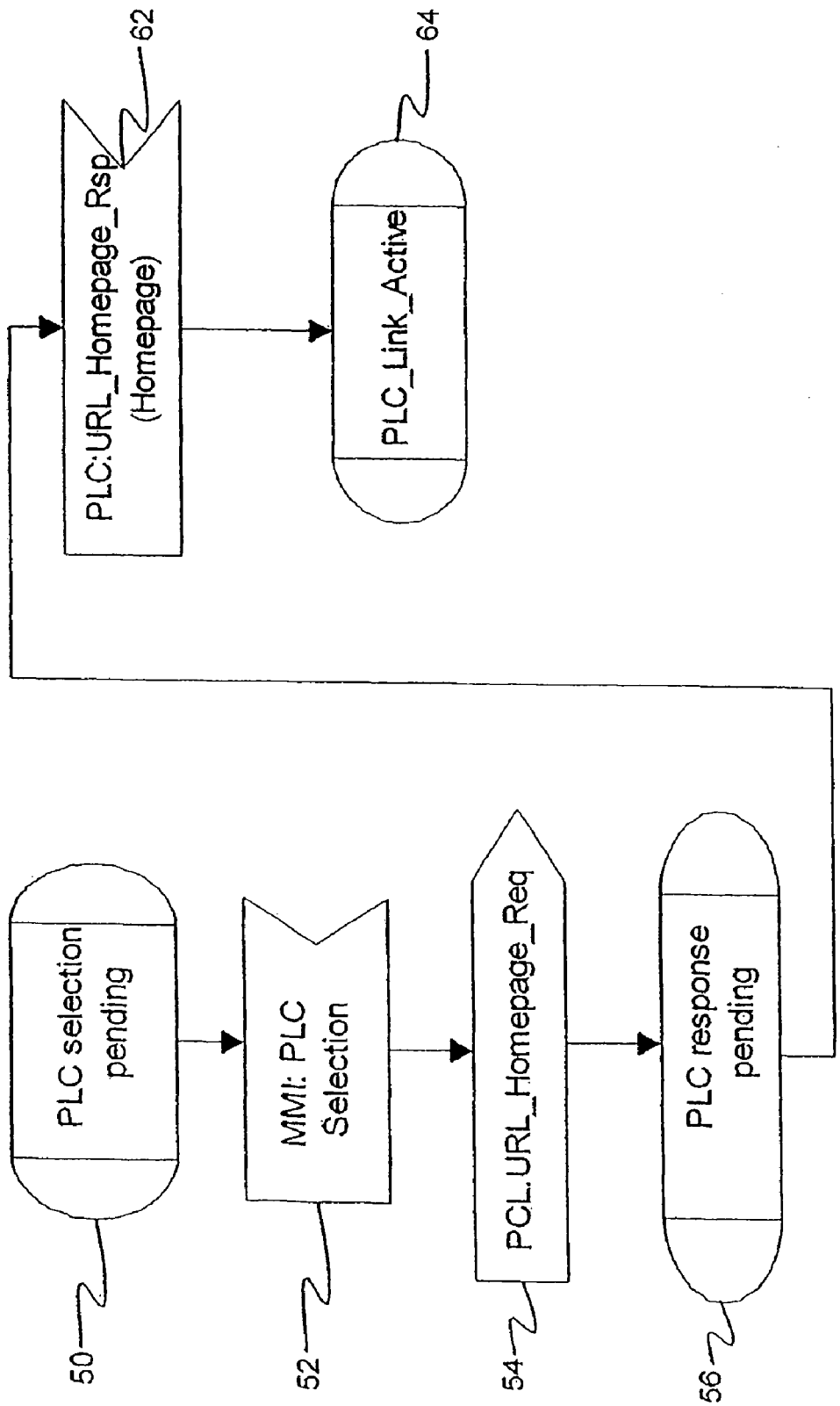

FIGS. 5, 6 and 7 are flow diagrams showing the initial and subsequent detection procedures operated by control devices to detect controller devices according to embodiments of the present invention. FIG. 5 shows a flow diagram for initial detection of a controllable device by a controller device. The controller device is, for example, a WAP enabled mobile phone. Initially, the phone is in idle mode at step 40. Upon selection of an option to "find local devices" displayed on the phone MMI at step 42, the phone performs detection of local PLCs at step 44. At step 46, if the phone has not detected a local PLC, the process returns to step 40. However, if the phone has detected a local PLC, the process continues to step 48 where the phone displays a selection menu on the MMI showing the one or more PLCs detected in the locality. During detection at step 44, the MMI of the phone will look like FIG. 8a). At steps 48 and 50, the MMI of the phone will look like FIG. 8b). For controller devices and controlled devices using BT as a proximity bearer, standard BT detection procedures are used to perform the steps described above.

FIG. 6 is a flow diagram showing the process followed when the PLC of a controlled device has not previously been accessed by the controller device. Continuing from step 50, the user selects a PLC using the MMI of the phone at step 52. This generates a hypermedia request to access a "home page" of the PLC at step 54. At step 56 the PLC response to the request is pending and at step 58 the PLC, knowing that the controller device has not been registered in an access register, provides a response to the request requiring input of a personal identification number (PIN) from the user. The PLC is aware that the controller device has not previously accessed the PLC, because it maintains a controller device or user identifier, such as a BT identifier or MSISDN in an access register. At step 60, the user enters the required PIN using the MMI of the controller device and a message is passed to the controlled device providing this PIN. At step 62, the PLC responds with the home page of the controlled device. At step 64, the PLC enters a proximity link active state.

FIG. 7 is a flow diagram showing the corresponding process followed where the PLC recognizes the controller device requesting access using a BT identifier or MSISDN identifier obtained from the controller device. The flow diagram is the same as for FIG. 6 except that steps 58 and 60 are omitted.

Once the PLC of a controlled device has sent a hypermedia data message constituting a "home page" of the controlled device to the controller device, the user of the controller device may navigate through menu options presented on the MMI in a manner similar to navigating through a Internet Web site having first accessed the home page of the Web site. However, unlike navigating through a Web site, the actions of the user of the controller device may result in the control of the controlled device. Furthermore, the current status of the controlled device may be presented to the user of the controller device and menu options corresponding to currently available actions that may be performed by the controlled device are dynamically presented to the user of the controller device as the user navigates/controls the controlled device. Thus the controller device is being dynamically programmed to control the controlled device by the controlled device itself.

FIGS. 8*a*) to 8*l*) show the MMI of a controller device, i.e. the screen and keypad of a Web or WAP-enabled mobile phone as a user navigates through menu options presented to him. After selecting an option to search for local devices using, for example, standard BT detection procedures, the mobile phone displays a message as shown in FIG. 8*a*), indicating that the phone is searching for a PLC in the neighborhood. FIG. 8*b*) shows a selection menu for selecting one of three controllable devices equipped with PLCs in the neighborhood. The user selects a Sony™ CDP-123 CD player. FIG. 8*c*) shows a home page of the Sony™ player giving the user options to play a CD, select tracks, receive disk information or open the CD tray. No option to stop or pause the playing of the CD presented because the CD is not currently playing. The menu options are presented are hyperlinks which when selected by the user generate hypermedia request messages for sending to the controlled device.

In FIGS. 8*a*) and 8*b*) the screen displayed by the phone is not a displayed Web or WAP page or card, although if the phone were equipped with its own PLC functioning as a proxy for remote PLCs then a Web or WAP page or card may be displayed by the local PLC. However, FIG. 8*c*) shows a Web or WAP page or card received from the PLC of the controlled device and presents it to the user of the phone by a browser application. FIG. 8*d*) shows another page or card displayed by the phone. The page or card displays status information—such as the fact that track 12 is playing—and menu options corresponding to actions of the control device that may be instructed by the user. FIG. 8*e*) shows a page or card displayed by the phone in which the user may select complex options such as the playing of a selected number of tracks of the CD. This may be achieved by using forms or applets for capturing complex user instructions before, generating a hypermedia request message for sending to the controlled device.

Figure 8I:
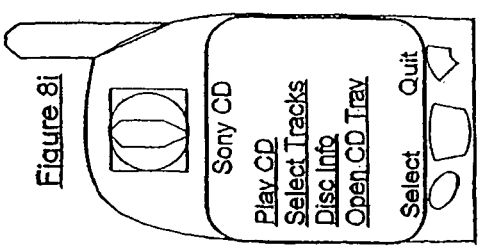
FIGS. 8a) to l) show typical user interfaces presented to a user of a remote controller according to the present invention.
Figure 8L:
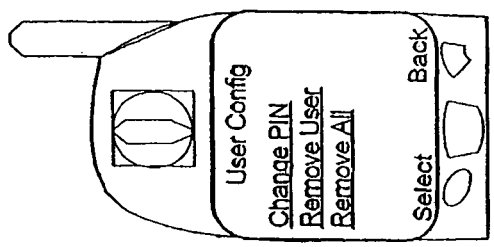
Figure 8H:
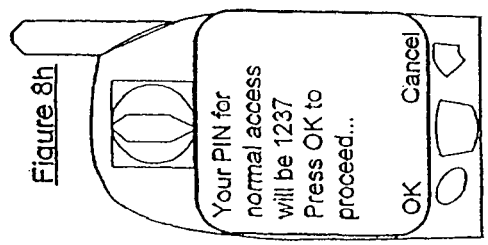
Figure 8K:
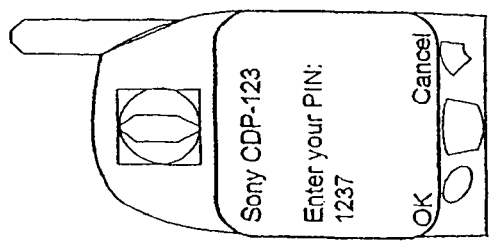
Figure 8G:
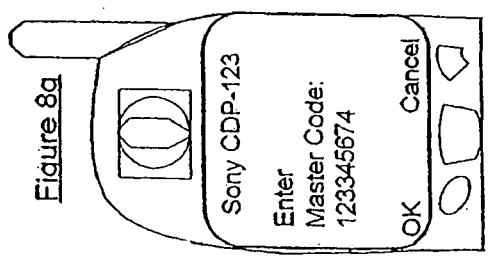
Figure 8J:
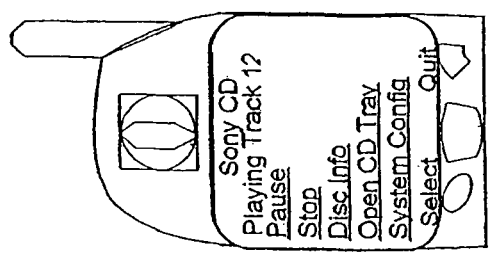

FIGS. 8*f*), 8*g*), 8*h*), 8*k*) and 8*l*) relate to security options which may be implemented in the present invention. If the phone has not accessed the PLC of the controlled device before, the PLC may send a PIN request page or card for presentation to the user such as shown in FIG. 8*g*). The user enters a master code provided in documentation accompanying the controlled device and upon submission is presented with a page or card such as shown in FIG. 8*h*) showing a user level PIN access code. If however the master code entered is invalid, the PLC sends a page or card such as shown in FIG. 8*f*). After authentication, the PLC sends normal operational pages or cards to the phone such as shown in FIGS. 8*i*) and 8*j*) and such as described above with reference to FIGS. 8*c*) and 8*d*). Upon subsequent access by the mobile phone to the PLC of the same controllable device, an initial authentication screen such as shown in FIG. 8*g*) is not presented. Instead, a subsequent authentication screen such as shown in FIG. 8*k*) is presented in which the user is asked to supply a user level PIN. Upon successful entry of the PIN, the PLC proceeds to display normal operational cards or pages such as shown in FIGS. 8*i*) and 8*j*). FIG. 8*l*) shows a screen for controlling user level PINs which may be accessed on supply of a master level PIN.

Figure 9:
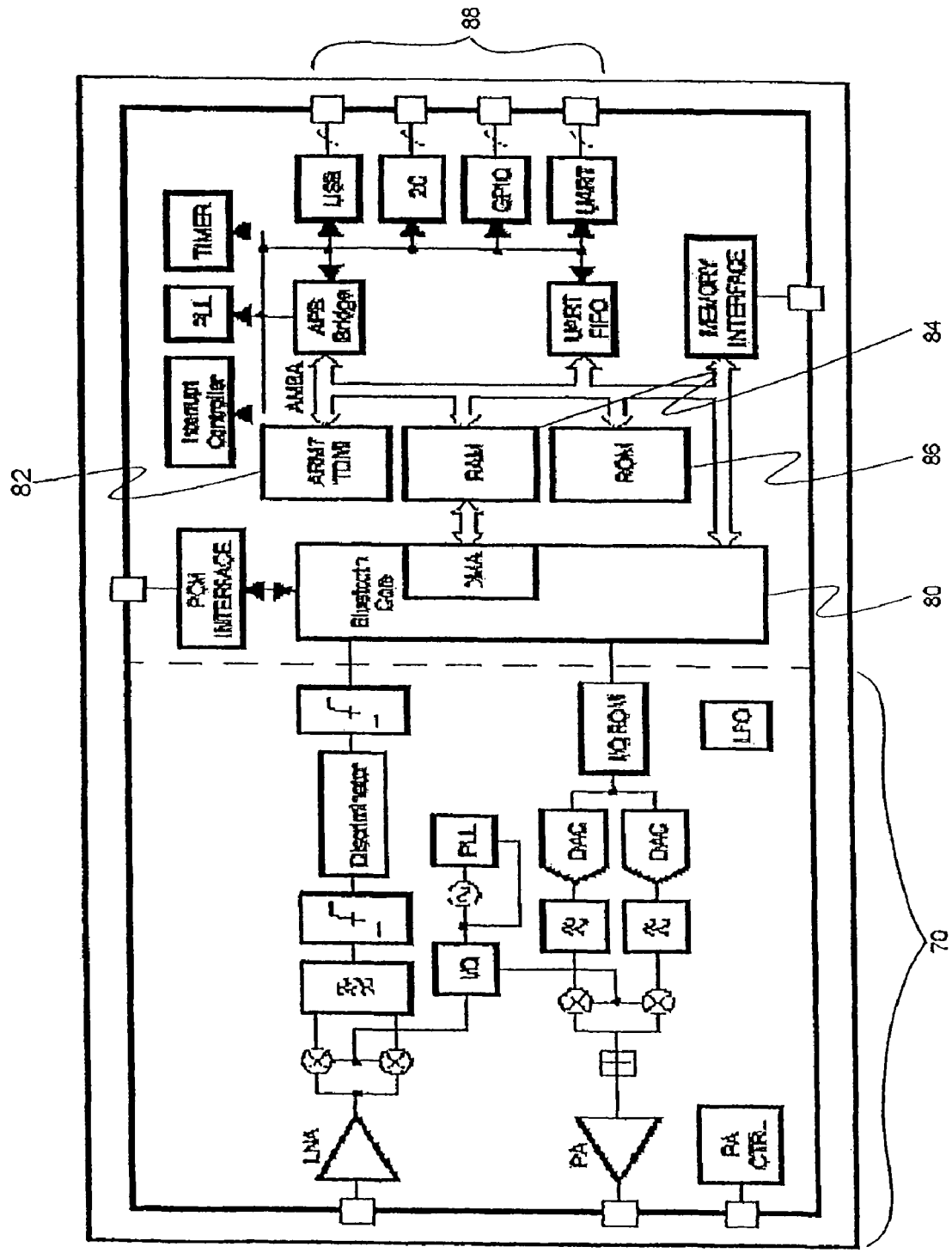
FIG. 9 is a circuit diagram of an control unit for a controlled device according to an embodiment the present invention.

FIG. 9 shows a circuit diagram for a control unit, which may be implemented as an integrated circuit, for use in a controlled device such as a consumer electronics device. The control unit comprises a radio frequency front end 70 connected to a proximity bearer protocol core 80 such as a BT core. The control unit also comprises a microprocessor unit 82, random access memory 84 and read only memory 86. The hypermedia protocol stack and proximity bearer stack may be implemented in the proximity core 80. The HCRF, HCVM and DHCI may be stored in ROM 86 and/or RAM 84 and executed by microprocessor 82. Microprocessor 82 may interrogate and control the controller of the consumer electronics device via various interface means 88. These interface means include a universal serial bus (USB), an Inter Integrated Circuit Bus (I2CB), a general parallel input output bus (GPIO) and a Universal Asynchronous Receiver Transmitter (UART).

The present invention is described in further detail in a technical report document appended hereto as Appendix A.

It is to be understood that the controller devices of the present invention are not limited to mobile phones or PDAs but may be any data processing device whether fixed or mobile which is capable of hypermedia communication whether over a radio interface or over a wired data network. It is also to be understood that the controlled devices according to the present invention may be any data processing devices capable of hypermedia communication whether over a radio interface or over a wired data network. Typically, but not necessarily, the controlled device will be a consumer electronics device such as a CD player, refrigerator, etc. Throughout this document, the term hypermedia and hypertext have been used to refer to any data representation capable of comprising data object referencing other data objects, such as text, audio or visual data etc. It is also to be understood that, while proximity bearers such as BT and IrDA have been described for providing remote communications between a controller device and a controlled device, the present invention may be implemented using a data communication bearer. For example, communication may take place over local area networks, IP networks, public switched telephone network, or cellular mobile networks such as GSM.

Appendix A

I. Foreword

This document describes the Hypertext Control System (HCS), which is a system for controlling and observing a device using a controller capable of hypertext communication.

II. Scope

Description of Remote Control System for Control of Devices via Hypertext over Proximity Bearers.

III. References a. GSM for MSISDN
b. Bluetooth for BTi
c. IrDA for Iri
d. RFC for HTTP IV. Acronyms and Abbreviations

| BT | Bluetooth |
|---|---|
| Bti | Bluetooth Interactive |
| CED | Consumer Electronic Device |
| DD | Device Domain |
| DHCI | Device Hypertext Control Interpreter |
| GSM | Global System Mobile |
| HC | Hypertext Controller |
| HCID | Hypertext Controller Identifier |
| HCL | Hypertext Control Language |
| HCRF | Hypertext Controller Request Filter |
| HCVM | Hypertext Control Virtual |
| HCVM | Hypertext Control Virtual Machine |
| HEnc | Hypertext Encoder |
| HIPE-L | Hypertext Interactive Proximity Environment Language |
| HPS | A Hypertext Protocol Stack |
| HTTP | Hypertext Transport Protocol |
| IMode | Internet Mode (Japanese Mobile Internet Standard) |
| ISO | International Standards Organisation |
| LC | Link Controller |
| MSISDN | Mobile Station International Subscriber Digital Number |
| PB | Proximity Bearer |
| PLC | Proximity Link Controller |
| WBXML | Wireless Binary XML |
| WML | Wireless Markup Language |
| WSP | Wireless Session Protocol |

Introduction

This document describes the Hypertext Control System (HCS), which is a system for controlling and observing a device using a controller capable of hypertext communication. More particular, but not exclusively, the system relates to methods of, computer programs for, and apparatus for control and observation of a device from a mobile communications device via a proximity bearer.

Background

WAP & WML

The Wireless Application Protocol (WAP) is a standard for the presentation and delivery of wireless information and telephony services on mobile phones and other wireless terminals.

To date wireless terminal manufacturers representing 90 percent of the worlds market across all technologies have joined the WAP Forum™.

The WAP has been developed as much as possible with the use of existing industry standards in particular Internet standards. The WAP forum also has formal liaison with International standards and specifications bodies such as:

W3C, TIA, ETSI etc These facts make WAP of particular interest as a vehicle for such control systems such as HCS.

The markup language used in WAE—is Wireless Markup Language(WML). WML is a tag-based document language specified as an XML document type. Thus, WML may be generated with many standard authoring tools. Dyamic WML can be generated by such standard mechanisms as CGI, Perl ASP and similar. WML coding has been specially designed to make efficient use of Wireless bearers.

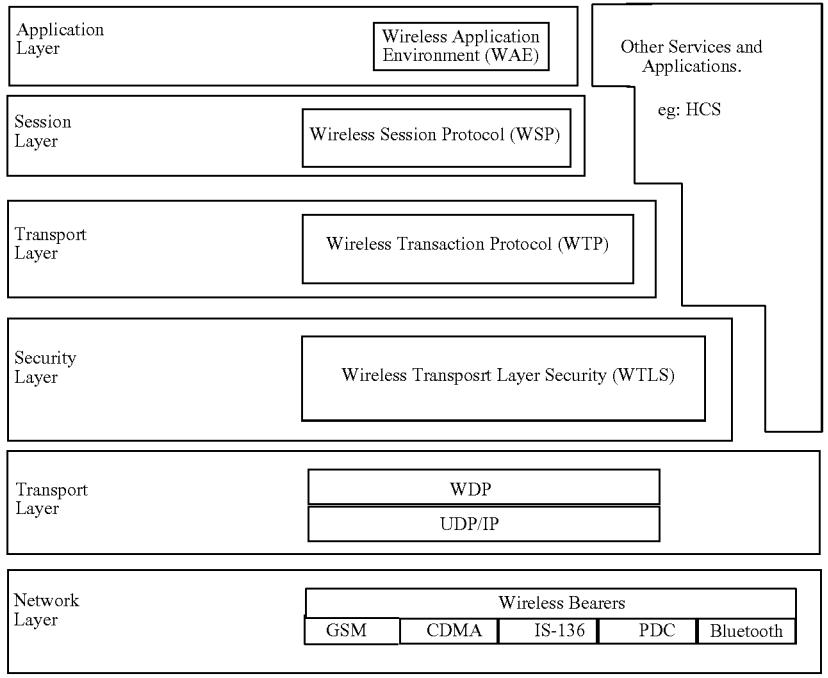

The Wireless Application Protocol Stack

Bluetooth

Bluetooth is a short range radio link intended to be a cable replacement between portable and or fixed electronic devices.

Bluetooth operates in the unlicensed ISM band at 2.4 GHz. A frequency hop transceiver is applied to combat interference and fading. The symbol rate is 1 Ms/s and a slotted channel is applied with a nominal slot length of 625 micro seconds. A TDD multiplex system is used for full duplex operation. Bluetooth can support up to 3 simultaneous voice channels at 64 k/bps.

Bluetooth provide point to point and point to multipoint connections.

The Bluetooth Link manager supports inquiry and paging procedures which allow a Bluetooth module discover which units are in its transmission range. This GIAC general inquiry mode allows the source bluetooth device to select certain device types via. a DIAC (dedicated inquiry access code)

HCI Driver

This establishes a link between the hardware and the protocol stack. and is specific to the Baseband implementation.

The I²C-Bus

The i²c bus is a simple bi-directional 2-wire bus for efficient inter-IC communication.

The system allows direct connection of IC controllers for interfaces such as LCD controllers. I/O ports and as in the example in this document MMI controllers.

| The bus consists of 2 lines | |
|---|---|
| SDA | Serial Data Line |
| SCL | Serial Clock Line |

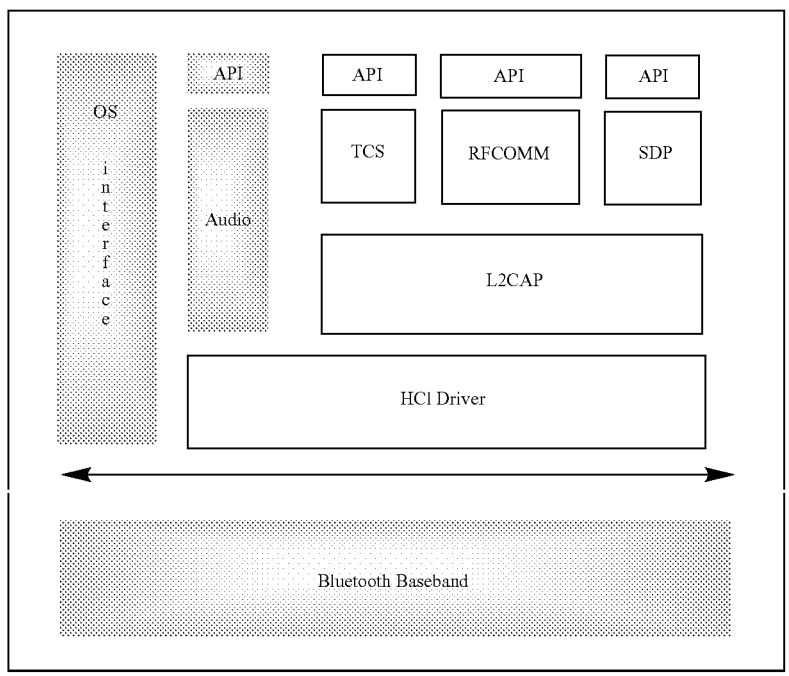

RFCOMM:

This is the transport layer of Bluetooth with provision for RS-232 serial port emulation. This protocol supports up to 60 simultaneous connections between Bluetooth Devices.

Rfcomm can transmit up to 32 Kbps over each link.

SDP

This is the Service Discovery Protocol which provides a means for applications to discover which services are available and to determine the characteristics of those available services using an existing L2CAP connection. The service discovery application does not make use of the SDP as a means of accessing services but rather as a means of informing the user of a Local Device the services that are available on the Local Device and or via Remote devices.

L2CAP

This is the Logical Link control and application Protocol. This provides connection-oriented and connectionless services to the upper layers.

Each device connected to the bus has an individual address to allow any device to communicate with ay other device on the bus. Communication is done on a master-slave basis however the bus is a true multi-master bus with collision detection and arbitration between masters.

Serial 8 bit data transfer is supported fro 100 Kb/s to 400 Kb/s. The supporting interface chips have spike filtering on the data lines and the maximum number of chips that can be connected is only limited by the line maximum capacitance of 400 pF.

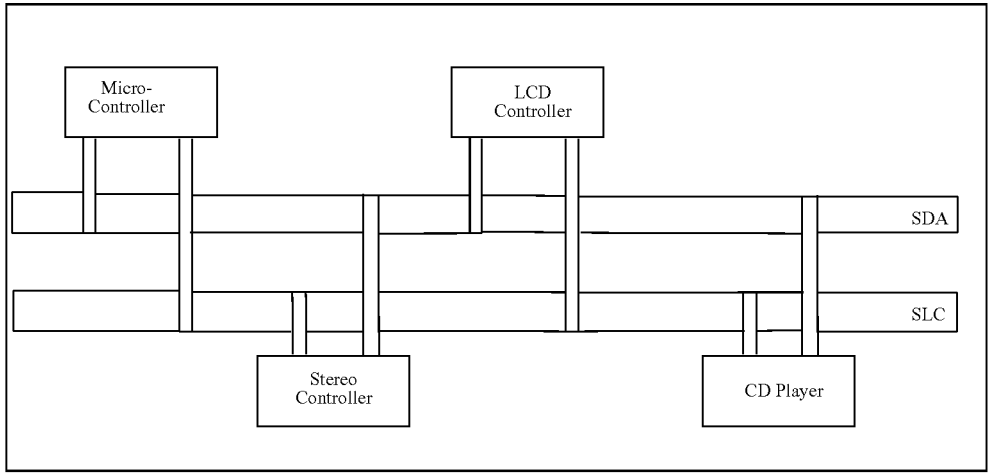

Blue Velvet

BlueVelvet is a complete Bluetooth system fully integrated in a single silicon chip. The chip integrates: RF front end, baseband, ROM, RAM, MCU (ARM7TDMI operating to up to 40 MHz) and Peripherals A pure CMOS solution is used to achieve a very low cost solution. The RF-CMOS8 process especially optimized for Bluetooth single chip system is used.

BlueVelvet is compliant with Bluetooth specification V1.0 for Class 2 (0 dBm) and for Class I (20 dBm) using an external power amplifier.

Chip Features
  32 KBytes internal SRAM, 200 Kbytes internal ROM
  Low power consumption, different power modes and wake-ups
  Two IRDA interfaces
  8 general purpose PIO pins
  JTAG debug interface and debug signals for logic analyzer support
  I2 C interface
  Integrated 12 Mbit/s USB interface V1.1 in slave mode
  PCM
    Linear (13-16 bit) or U-law or A-Law (8 bit)
    Fr: 8 KHz, Clock: 200 KHz-2 MHz SW Support ST is providing a set of base standards licensed from Ericsson™ to ensure interoperability:
  Basic Bluetooth stack
    Baseband, LMP, HCI, L2CAP, SDP
    Higher layer Bluetooth protocols:
      RFCOMM, TCS-BIN, SDP, . . .
  ST is supporting different software implementations
  2 processors solution based on HCI interface
  1 processor solution with embedded application System Overview This is a System which allows any device capable of Hypertext communication to control/observe a Device which contains a HCS-Link Controller(HCS-LC). The communication between the Controller and the Controlled Device is typically but not necessarily a Proximity Bearer(PB). In the case of a Proximity bearer this HCS-LC is simply called a Proximity Link Controller(PLC).

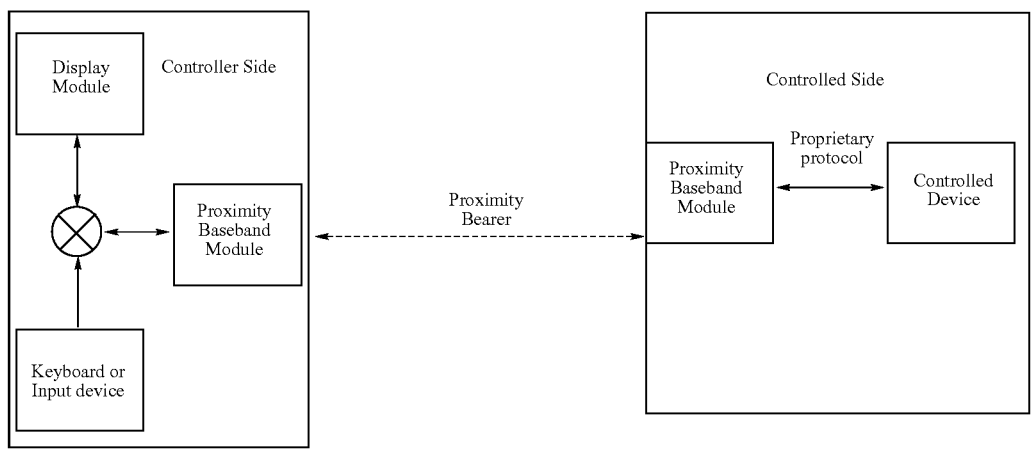

Comparison with Traditional Systems

Implicit in a traditional remote control and observation devices the following assumptions:

1. The Remote Controller has prior knowledge of the command set or protocol used to control the CED device.
2. The Remote Controller has a specific command set for only a specific device or a specific set of devices from a single manufacturer of CEDs.
3. Unreliable link for most IrDA-based controllers—no message acknowledgement from the CED to the remote controller.
4. No security protocol between Remote Controller and CED.

Main Features of the HCS System are:

1. Control and observation of a device equipped with a HCS-Link Controller using hypertext communication
2. Controller independence of the Controlled Device, Control Protocols and Command Syntax.
3. HCS-LC discovery and Selection (initiated by prospective controller)
4. HCS-LC Session management
5. HCS-LC Access Rights & Security management Enhanced Remote Control Enhanced features of HCS remote control are:

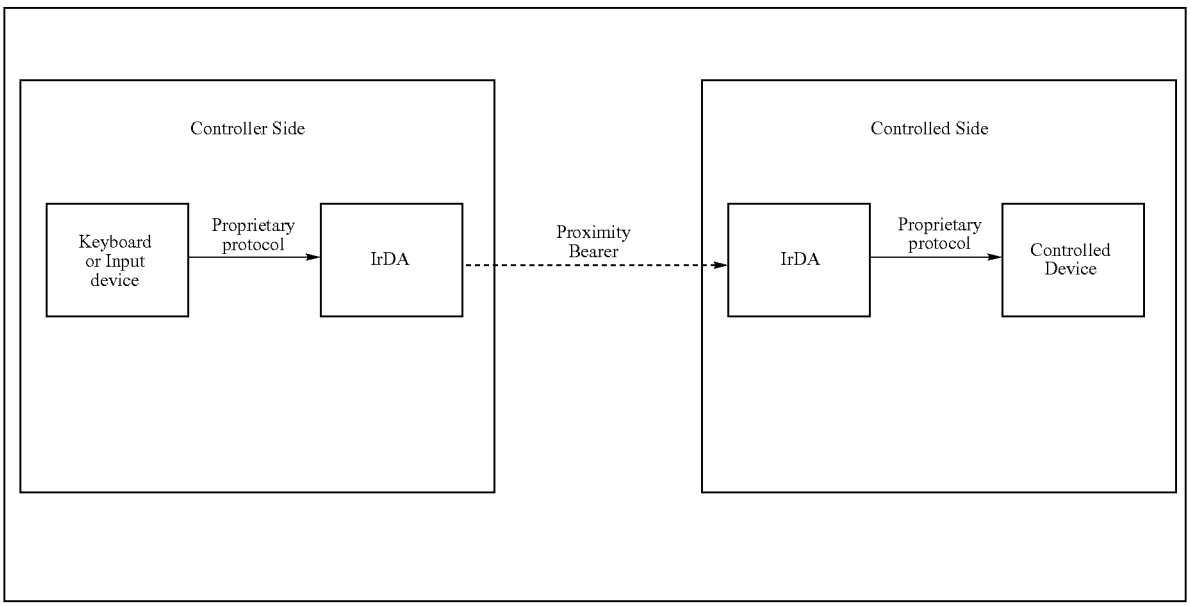

HCS is novel in at least the following ways:

1. The Controlled device makes its presence known to any device wishing to control it by identifying the Link as a HCS controlled Link.
2. There may be master-slave or peer to peer control and observation.
3. The Controlling device needs no prior knowledge of any Controlled device other than its compliance to HCS.
4. The instantaneously available command set of the controlled device is communicated to the controlling device via Hypertext.
5. The control MMI is interactive and is programmed as an interactive State machine within the Bti device generating Hypertext Language in response to the Controller Command and the Device State.
6. The interactive MMI State Machine is written in a Language Called HIPE-L which runs on a link embedded Hypertext Virtual Machine. Command Translation Hypertext generation within the HCl (this is specific to our current implementation—not general)

1. Reliable link between HC and CED: usually there is no notion on a remote controller if a command has succeeded or not. The link is typically not reliable.
2. Real-time CED-status-dependent control and observation menu generation. The generated menu on the HC is dependent on the state of the consumer electronic device (CED). For example if a CD is playing, the options for Pause and Stop CD are displayed. If the CD is stopped then Play option is displayed.
3. Control menus downloaded from the CED/PLC to the HC. Not stored on HC long-term.
4. Interactive control involving both HC and CEDIPLC
5. More control using this medium. Each device can provide its own complex structure of menus to the HC (controller).
6. Control and observation status and command menus are passed as hypertext information which is rendered on the HC (Remote Controller).
7. Hypertext type independence. The controller can cope with generation of a plurality of hypertext types, for example WML, HTML and cHTML over different bearers.

System Architecture

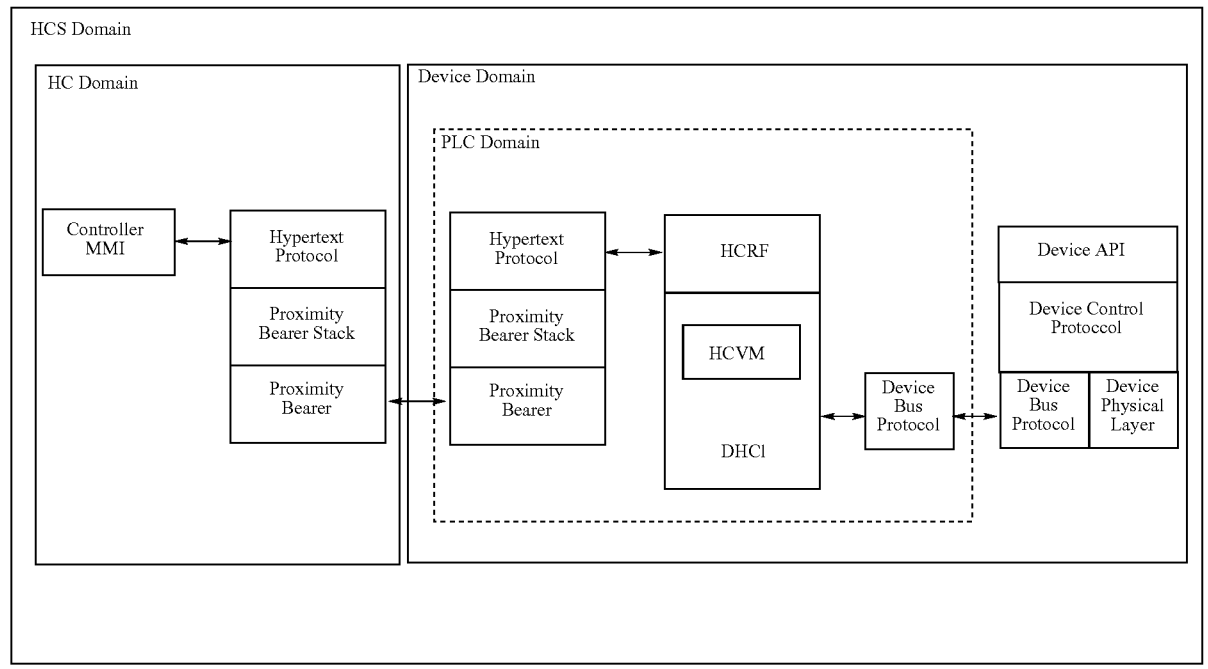

The diagram above shows the modular system overview of the HCS. We have segmented the system into natural modules and domains, relating to the Hypertext Controller (HC) and the Device Domain (DD). The Device Domain includes the PLC Domain which performs the Hypertext Control and Access, as in most use cases the PLC is situated within the consumer electronic product.

Proximity Bearer (PB)

A Proximity Bearer (PB) may be defined as a wireless communication channel within an area of less than about 100 meters. An example of such a Bearer is Bluetooth where most communication takes place between devices within a 10 meter radius.

The Hypertext Controller (HC)

This is an apparatus capable of hypertext-based control and/or observation of a selected device over a proximity bearer. More particular, but not exclusively, the HC apparatus may be a mobile communications device or a personal digital assistant (PDA). The HC may have a standard Proximity bearer baseband module or indeed a PLC as described in this HCS description.

Proximity Link Controller (PLC)

This is an apparatus used for detection of devices that are operating using the same bearer or bearers, that manages the proximity bearer, physical link, link integrity and networking over the bearer, link status, unique link identification, connection control amongst other functions. The PLC may additionally include the HCRF and Hypertext Control Interpreter (HCI).

Hypertext Controller Request Filter (HCRF)

This is a filter that directs control and observation-related Hypertext Request to the Hypertext Control Interpreter.

Device Hypertext Control Interpreter (DHCI)

This is a computer program that interprets Hypertext Requests using a Hypertext Control Virtual Machine that executes compiled Hypertext Control Language (HIPE) programs.

Hypertext Controller Virtual Machine (HCVM)

This is a virtual Hypertext machine used by the DHCI program to generate the correct Hypertext format and encoding in response to the HC requests. It may also have included in it the format and encoding of the command set for the Device in which the PLC resides*. This allows the programmer of a HCI to issue commands in an abstract way to the Device and issue Hypertext responses independent of the Hypertext type used.

Hypertext Protocol Stack (HPS)

A Hypertext Protocol Stack is a protocol stack based on the ISO model that is required for a particular Hypertext Protocol to be used. For example with a WAP mobile phone, the WAP Server Protocol stack is required on the PLC for WML-based communication and related encoding to take place.

Note * (This functionality may alternately be included in a Command transcoder module if the device manufacturer wished to keep proprietary the format and encoding of the device commands allowing third-party programming of the DHCI)

Functional Specification

The Hypertext Controller (HC)

The HC (typically a mobile communications device or a personal digital assistant (PDA)) provides or has access to module providing the following:
1. Proximity Bearer Protocol Stack
2. A Hypertext Communications stack (eg: WAP)
3. Mechanisms for performing Hypertext Communication via this Proximity bearer
4. Mechanisms for Proximity bearer detection 5. Mechanisms for Proximity bearer Selection for use as a Hypertext medium.

Whereas it is not excluded that the HC-MMI may have HCS specific commands it is not a requirement. Typically all of these requirements are fulfilled by a communications device with Hypertext enabled for communications over a detected proximity bearer.(eg: Mobile phone with a WAP enabled Bluetooth bearer)

Proximity Link Controller (PLC)

Requirements

This is the core of the HCS system and provides the following Functions:
1. Proximity Bearer Protocol Support
2. Hypertext Communications Support (eg:WAP)
3. Mechanisms for performing Hypertext Communication via this Proximity bearer
4. Mechanisms for Proximity bearer detection and presence signaling
5. Mechanisms for Proximity bearer Selection for use as a Hypertext medium.
6. Hypertext Request Filtering (HCRF)
7. Hosting of a Hypertext Virtual Machine (HCVM) for execution of the DHCI module
8. Device Bus Protocol support
9. Device Bus specific Command transcoding (optional)

Functionality

This module is responsible for providing a device with the capability of being controller via a HC Hypertext Controller Request Filter (HCRF)

Requirements

This module is typically but not essentially a component of the PLC which provides the following functions:
1. Decoding of incoming PLC Hypertext Request Headers
2. Filtering one or more URL requests to the DHCI module for processing
3. Transparent transport of non HCS URL requests.
4. Support of multiple Hypertext formats (optional depending on DHCI implementation)

Functionality

This module has the task of recognizing the returned requests for URL based upon their header information and routing it to the DHCI to allow execution of the related Device command.

The HCRF uses a Uniform Resource Locator data string prefix (up to the full length of the URL data string) or coded version thereof to identify Hypertext Requests to be filtered into the Hypertext Control Interpreter. The URL will include the prefix which identifies its control/observation request purpose and other parts of the URL may optionally include a data string describing the requested control or observation command. Alternatively, the control and observation command data may be stored in other parts of the Hypertext Request, such as HTTP Headers in HTTP protocol. Other protocols that may be used for hypertext communication are but are not limited to WSP protocol.

Hypertext Control Language (HCL)

Requirements

The Hypertext Control Language is required to include the following functionality regarding its syntax:
1. Multi-lingual output definition
2. Definition URL Links and pictograms to be sent to the HC
3. Device bus Command/Response
4. Timing/Timer definitions Device Hypertext Control Interpreter (DHCI)

Requirements

This module handles Hypertext Protocol Session as well as configuring the HCVM for execution of required Compiled Code necessary to perform a specific observation or control or menu display task. This module can be seen as a configuration module for the HCVM. The main required functions are:
1. Invoking and configuration of the HCVM
2. HCVM Response Handling per (Hypertext type, Timeout state, Device state
3. Hypertext Response Dispatching
4. Hypertext Session Management
5. Hypertext Request Processing
6. HC and User Profiling
7. HC and User Security Functionality The DHCI produces hypertext or encoded version of the hypertext in the same Hypertext syntax and human language as the Hypertext Request that was issued by the Hypertext Controller. The menu language may be specified by a Hypertext Protocol Header such and a HTTP Header in HTTP e.g. ("Accepts") or by a Hypertext Controller Identifier—specific setting stored on the PLC.

The headers that the DHCI requires are the following:
Accepts: language capabilities and character sets
User-Agent: browser type and version
Other Specific iMode WAP or HTML headers: used for identification of the Hypertext Protocol and also for guidelines such as capabilities or screen sizes.

The DHCI takes the form of a program written in a language called HIPE. This program is compiled to an intermediate format which is readable by the HCVM.

In this way the different responses in the different natural languages may be pre-compiled. The knowledge about hypertext encoding is considered fixed and this is part of the HCVM.

Hypertext Controller Virtual Machine (HCVM)

Requirements

This module is a component of the PLC and is the virtual hypertext machine on which the DHCI code is run. It provides the following functions:
1. URL request dependant State Transition management
2. Timeout management
3. Device State enquiry
4. Hypertext generation & formatting
5. Device Command generation & formatting*
6. Device Command Dispatching*

Functionality

This module adapts its state dependant on the programming of the DHCI as the DHCI will prime the module and configure the HCVM with the following information:
Hypertext Language currently required (for example WML)
The parameters that are to be passed top a function as aguments
The function to be executed
User Specific and HC specific data, such as HCID The HCVM will the use the Compiled Code (CC) and execute the required function.

The HCVM will return out of the function producing the required Hypertext as output in standard or encoded form and passing suc Hypertext content to the DHCI.

Note * (This functionality may alternately be included in a Command transcoder module if the device manufacturer wished to keep proprietary the format and encoding of the device commands allowing third-party programming of the DHCI)

In one embodiment, HIPE and CC are generating Hypertext responses that assumes that the Consumer Device bus provides only command responses. An alternative method is to allow a consumer device to create menu syntax and the PLC DHCI converts such syntax into required hypertext and hyperlinks.

HC. The device shall respond to the HC with a PB Device Access Response. These responses are recorded and provide CED name identifiers which are presented to the user as a typical HC system menu (option 1) or Hypertext (option 2).

Such menus may optionally be produced with device categorization according to functionality.

Initial PLC Selection Procedure

The user now selects from the list the Device Access Response of the Device to be controlled. This issues a request

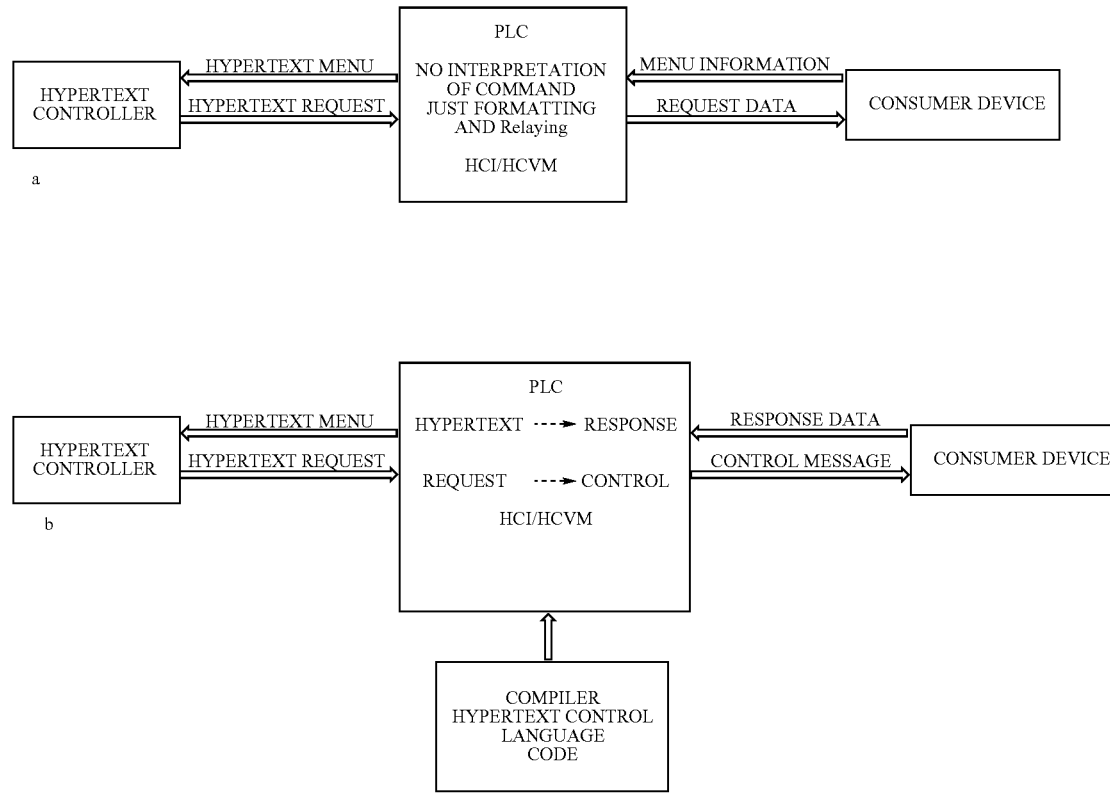

Procedures

Initial BT/PLC Detection Procedure

The HC user selects the option on an MMI menu to enter into "Hypertext over PB" CED detection mode. Such a menu option may be denoted by "Find Local Devices" on a phone MMI menu. After detection is completed the user is presented with a list of the available devices to connect to. This list typically contains device descriptive text extracted from the PB-Profile information conveyed upon detection.

Filtered Detection (Optional)

Upon choosing PB Detection the HC shall commence filtered detection of PB Devices. The filtering is done by forming an internal list of all CED devices which responded to the unique PB Device Access Request (URL request) from the to the Device for access. The PLC looks in the PB Hypertext Controller Device Access Register (HC-DAR) upon reception of every Hypertext command for control or observation and since this is an initial access by the controller device there is no matching entry in the register for the controller device. If the PB is Bluetooth, the Bluetooth Identifier may be used to identify the HC, which is obtained by the DHCI of the PLC from the Proximity Bearer Stack of the PLC.

The non-existence of a matching HCID in this register shall result in the Controller receiving a Hypertext response requesting a device specific Access Code. If correct the device shall (1) register the HCID along with its access classification in the HC-DAR and (2) serve the Control and Observation Deck associated with this access code to the controller device.

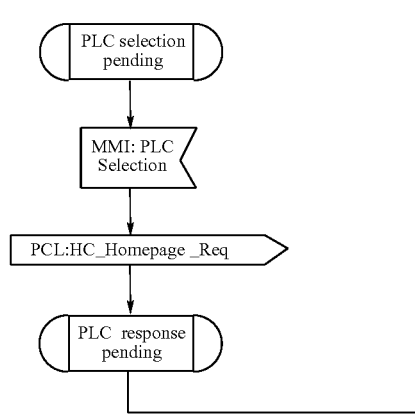

Subsequent PLC Selection Procedure

In all subsequent access made by a controller device on a PLC the HCID shall be recognized as an allowed controller and shall be directly served with Hypertext containing Hyperlinks to Control and Observation functionality.

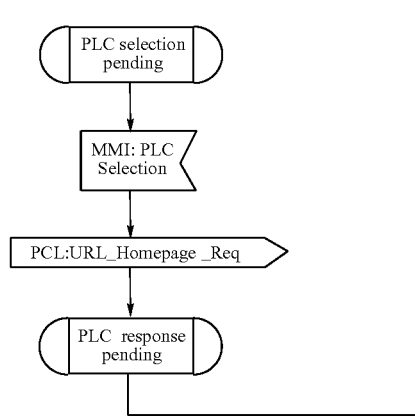

PLC Configuration Procedure

Global and user-specific settings may be configured optionally after entry of the PLC Maser PIN code. The security aspects of such configuration options are covered in the Security Issues section Issuing Control & Observations Commands by HC The Command is issued simply by making the request for a link concerning the control itself, usually by making a key press on a mobile communications device or selecting and pressing an area of a touch screen. Audio and tactile input is allowed for such selection. This Command is encoded as a Hypertext Request and later identified in the PLC by the HCRF and filtered to the DHCI for interpretation.

The Hypertext Request can be any of the common fixed and mobile Internet Hypertext Protocols (WAP/WSP, HTTP, cHTML/HTTP). The Hypertext Response will be of the same type as the Hypertext Request. For example, if the Hypertext Request was a WAP WML request, the response will be in encoded WML.

The HIPE language allows the definition of devices within the language. Devices are defined as bus devices that can be accessed over a specified bus and device identifier. Such busses include: serial, $I^2C$, USB, SCSI and others. The language can be used to construct specific functions that will send command strings and receive status strings or acknowledgements back from a identified device on a specific bus.

The HIPE language construct used is as follows:

```
REQUEST         bytes_IDENTIFIER        FROM
dev_IDENTIFIER
        GIVING  bytes_IDENTIFIER        OF
int_IDENTIFIER WITH TIMEOUT
```

For example, the following command from the sample program included in Appendix 1 sends a command to a CD player and waits for a response with timeout:

```
DEVICE cd IS I2C(1)
...
REQUEST output FROM cd GIVING input OF ilen
WITH TIMEOUT 500
```

The DEVICE command defines a specific device.

The output parameter is a byte stream that is relayed to the device cd. The input parameter is the byte stream that will be received back from the CD player device.

The Hypertext Response is produced by the DHCI. The DHCI configures the HCVM to output a specific type of Hypertext. The HCVM runs Compile Code that has been compile and assembled form source files that have been programmed in a special language called HIPE. The generated hypertext from the HCVM forms the basis of the DHCI Hypertext Response to the HC.

The interpretation of the requests has been programmed in the DHCI code which runs on the HCVM. The HCVM allows the DHCI code to be very compact and to support multiple Hypertext languages and have multi-lingual or even user selectable human language responses. Example of a HIPE-L program is described in the Language Overview A Hypertext Encoder may need to be optionally present in system if the DHCI does not produce encoded form of Hypertext for certain Hypertext Language and Protocol combinations, for example iMode and HTTP or WML and WSP. The DHCI may also generate already encoded hypertext, i.e. WBXML-encoded WML format is output directly from the HCVM for WML.

Note: The Compiled Code (CC) is the binary file that is produced by compiling and assembling a source code of a program written in the HIPE Language. The CC is of a specific type as it contains device-specific control and/or observation command definitions for one or more devices. Furthermore, the CC contains control and observation menu definitions defined in one or more human languages—used for internationalization. The CC is intended to be stored in storage accessible to the Blue Velvet Chip. The HCVM the interprets the COMPILED CODE is capable of using menu definitions defined in the CC to generate the appropriate Hypertext Responses to a Hypertext Request that has been requested by from the HC and passed into the HCVM by the DHCI.

Security Issues

User Authentication, Identification and Authorization

When a user using the HC attempts access to a CED, several methods of user authentication and HC authorization can take place. The techniques usually involve user, use-level or Master PIN codes:

User PIN code: is attributed to a particular HC and user

Use-Level PIN code is attributed to any allowed HC for a particular level of usage of the CED system Master PIN Code: is used to reset system or configure other PINs or users or HCs.

The following authentication scenarios have been envisaged:

1. Using a master code to allow/deny use-level PIN usage.

Use a use level PIN code to access device without subscription of any HC.

2. Using Master PIN code to subscribe a HC and no further authentication of user.

3. Use a Master PIN code to subscribe a HC and each time authenticate user using a user specific PIN.

4. Use a Master PIN code to subscribe a HC and each time authenticate user using a use level specific PIN.

CED-specific Access Classes

There shall be a minimum of 6 BTi device specific classes

Class 0 shall represent a

Barred device (optional)

Classes 1 . . . 4 Device Bti user codes (1 mandatory)

Class 5 Device

BTi master code (mandatory)

The normal entry mode is with one of the 4 the user classes

It is intended that the device manufacturer shall set up a list of all the functionality's and data controllable or displayable by a device and the Master Code shall allow the user to attribute groupings of these functionality's to each of the 4 user classes. In this way closed controller user groups can be supported.

Encryption

The PB channel should be encrypted for all security sensitive applications such as door access, car access, mobile commerce applications etc.

IMPLEMENTATION EXAMPLES

Bluetooth Interactive (BTi)

The BTi system is an implementation of the HCS system using Bluetooth as the Proximity Bearer (PB) and WML as the Hypertext Language. In particular the controlling device is a mobile device (Phone or PDA) which is capable of WAP over Bluetooth. The controlled device is a CD player with an integrated amplifier. The PLC is a Bluetooth silicon module called "Blue Velvet", into which the DHCI has been embedded, although a less integrated solution is also possible. Thus it is possible to communicate between the Mobile device and the audio controller using WML.

BTi Hardware Architecture

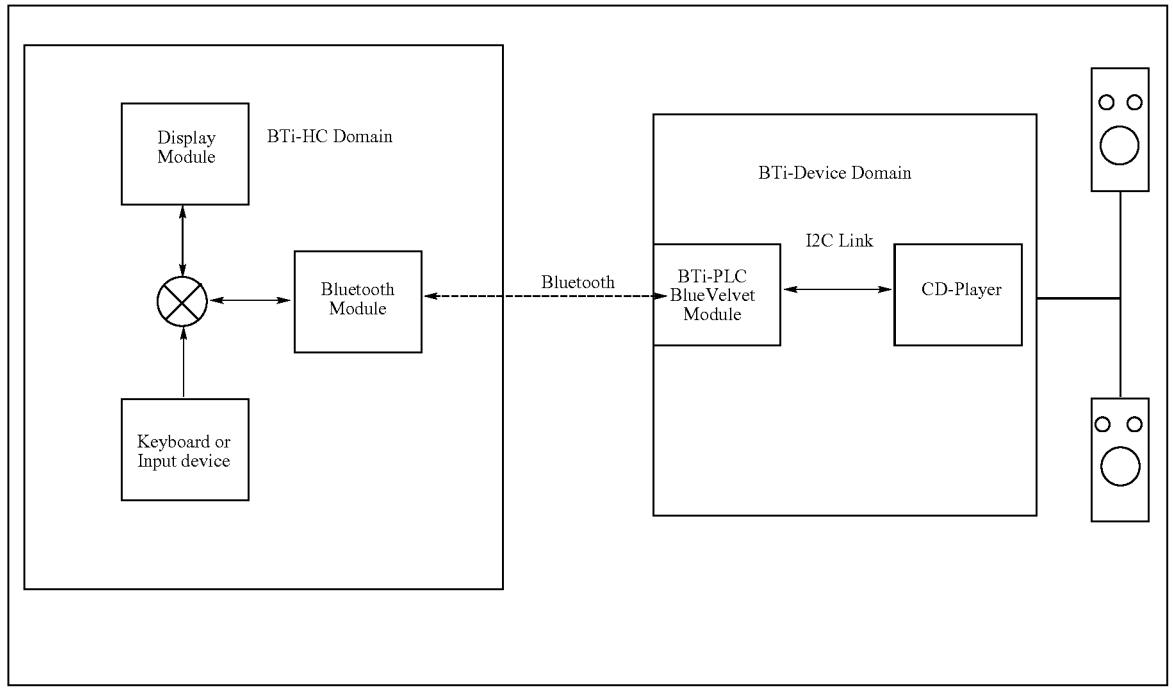

BTi—HC Domain

As stated above the Controller is and device which is capable of performing WAP over Bluetooth. No other special requirements exist for the Controller BTi—PLC Domain The BTi—PLC is a specially adapted version of the STMicroelectronics "Blue Velvet" Chip. The Hardware changes to the Blue Velvet chip depend of the level of integration required but the minimum changes involve an increase of the present internal memory to incorporate the SW required for BTi support and the addition of internal or external "protected" flash for the implementation of the Access Control & Security Registers.

BTi Device Domain

This is represented by a SONY CD Player with and I²C MMI control interface.

BTi Software Architecture

Functional Scenario for BTi:

CD Player Control Using Bluetooth And WAP-Enabled Mobile Phone As HC.

The figure below shows the system overview. A Bluetooth-enabled mobile phone is within 10 meters range of a SONY CDP-123 CD player. The Phone is also WAP-enabled allowing WAP over Bluetooth bearer communication. The user wishes to use the Mobile Phone as an HC (described earlier) in order to control and observe the CD Player actions.

User Activity

The Mobile Phone scans the Bluetooth Neighborhood. Following the Bluetooth enquiry for a number of seconds a list of available devices that are in the Bluetooth neighborhood are displayed. The user of the mobile phone then selects the desired device (in the example case the user selects the SONY CDP-123 CD player device). Following this device selection a PIN code may optionally be required requesting the user for either master PIN or user PIN entry. The Security Description is described in the Security MMI Use Case sec-

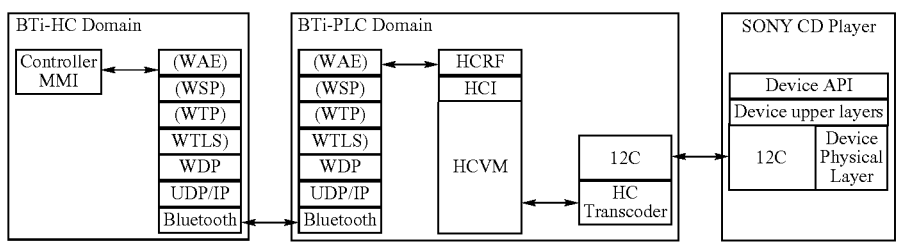

tion (below). Alternatively, and on successful PIN code entry the user-specific device-state dependent main menu of the device is displayed showing a stopped CD player. If the CD is playing then a state-dependent menu is returned. Particular attention is draw to the generation of complex functions such as Select Track where user of the HC can easily select the desired CD tracks to listen to. Following the Selection the user can Play the Disk and only the selected Tracks will be played.

The HC will time out after a period of non-use. The Bluetooth link will be terminated by the HC (master). Subsequent control of the previously selected device will require initial device selection and access procedures as outlined earlier in this section.

Security MMI Use Case

A Master PIN code may optionally be requested. A regular user or use-level pin code may optionally be requested. If the user of the HC enter an invalid code as Invalid PIN error warning may be displayed. Repeated incorrect code entry can disable use of the HC with a specific Hypertext Controller Identifier (HCID) for control of the selected CED device.

Note: Hypertext Controller Identifier (HCID) may be a communications protocol identifier attributed to a Hypertext Controller, such as the Bluetooth ID in Bluetooth or the MSISDN in GSM. It may also be a proximity identifier such as a vehicle registration number, were the device requires proximity to the vehicle.

4 Appendix I: Language Description

HIPE—Hypertext Interactive Protocol Language

HIPE is a new language for interactive control using hypertext languages for user interaction. The language named HIPE-L (Hypertext Interactive Proximity Environment Language) is intended to be used in devices capable of using proximity bearers such as Bluetooth and Wireless LAN (primarily devices capable of proximity ad-hoc networking). However it can be used for any kind of control through Web, WAP or other Hypertext standards.

Example Program in HIPE-L

The example below shows control of basic CD player function using a I²C-bus-controlled CD player. The program enables the user to control the player in English and Croatian (dependent on jumper settings).

```
 1. IMAGE imgbut_play IS "play.jpg"
 2. IMAGE imgbut_stop IS "stop.jpg"
 3. DEVICE cd IS I2C(1)
 4. BOOLEAN valid
 5. BYTES input LENGTH 10
 6. BYTES output LENGTH 10
 7. STRING status LENGTH 20
 8. DEFINE JUMPER 0 AS eng WITH main_menu
 9. DEFINE JUMPER 1 AS cro WITH main_menu
10.      STRING non_react LENGTH 20
11.      STRING stat LENGTH 20
12.      STRING stpd LENGTH 20
13.      STRING psd LENGTH 20
14.      STRING ply LENGTH 20
15.      STRING cnt LENGTH 20
16.      STRING stp LENGTH 20
17.      STRING paus LENGTH 20
18.      NUMBER num
19.      FUNCTION WILL BE got_track
20.      PAGE WILL BE action_pause
21.      PAGE WILL BE action_stop
22.      LABEL WILL BE redo
23.      LOCALE GLOBAL [
24.      PAGE action_play [
25.      STORE "G" IN output
26.      SEND output TO cd
27.      DO NOTHING FOR 1000
28.      GOTO LOCALE:redo
29.      ]
30.      PAGE action_continue [
31.      STORE "C" IN output
32.      SEND output TO cd
33.      DO NOTHING FOR 1000
34.      GOTO LOCALE:redo
35.      ]
36.      FUNCTION fetch_status [
37.      TITLE "CD Savvy 123CDP"
38.      STORE 0 IN input(*9)
39.      STORE "S" IN output
40.      NUMBER ilen
41.      REQUEST output FROM cd GIVING input OF ilen
    WITH TIMEOUT 500
42.      IF TIMEOUT OUTPUT non_react ELSE [
43.      OUTPUT stat
44.      NEWPARAGRAPH
45.      IF input(1) = '0' REMEMBER stpd AS status
46.      IF input(1 . . . 3) = '255' REMEMBER psd AS
    status
47.      EVALUATE input(1*) GIVING num
48.      IF (num > 0) AND (num < 255) DO
    LOCALE:got_track
49.      OUTPUT status
50.      IF num = 0 BUTTON ply FOR action_play
51.      IF num = 255 BUTTON cnt FOR action_continue
52.      IF (num > 0) AND (num < 255) [
53.      IF WML [
54.      BUTTON paus FOR action_pause
55.      BUTTON stp FOR action_stop
56.      ]
57.      IF HTML [
58.      IMAGEBUTTON imgbut_play FOR action_pause
59.      IMAGEBUTTON imgbut_stop FOR action_stop
60.      ]
61.      ]
62.      ]
63.      ]
64.      ]
65.      STRING trk LENGTH 10
66.      LOCALE eng [
67.      FUNCTION got_track [
68.      STORE "playing track " IN status
69.      EVALUATE num GIVING trk
70.      CATENATE status WITH trk
71.      ]
72.      PAGE main_menu [
73.      LABEL redo
74.      TITLE "CD Sony 123CDP"
75.      STORE "CD not responding" IN non_react
76.      STORE "Status:" IN stat
77.      STORE "stopped" IN stpd
78.      STORE "paused" IN psd
79.      STORE "Start Play" IN ply
80.      STORE "Continue Play" IN cnt
81.      STORE "Stop" IN stp
82.      STORE "Pause" IN paus
83.      DO fetch_status
84.      ]
85.      ]
86.      LOCALE cro [
87.      FUNCTION got_track [
88.      STORE "svira trak " IN status
89.      EVALUATE num GIVING trk
90.      CATENATE status WITH trk
91.      ]
92.      PAGE main_menu [
93.      LABEL redo
94.      TITLE "Sony CD 123CDP"
95.      STORE "CD ne reagira" IN non_react
96.      STORE "Stanje:" IN stat
97.      STORE "zaustavljen" IN stpd
98.      STORE "stanka" IN psd
```

-continued

```
99.     STORE "Sviraj" IN ply
100.    STORE "Nastavi" IN cnt
101.    STORE "Zaustavi" IN stp
102.    STORE "Stanka" IN paus
103.    DO fetch_status
104.    ]
105.    ]
106.    PAGE action_pause [
107.    STORE "P" IN output
108.    SEND output TO cd
109.    DO NOTHING FOR 1000
110.    GOTO LOCALE:redo
111.    ]
112.    PAGE action_stop [
113.    STORE "X" IN output
114.    SEND output TO cd
115.    DO NOTHING FOR 1000
116.    GOTO LOCALE:redo
117.    ]
```

Multi-hypertext Generation

The HIPE-language uses HTTP Protocol Header information, URL request and information relayed in HPS-structured information.

For systems accepting WML, the following lines of HIPE source code:

```
BUTTON paus FOR action_pause
BUTTON stp FOR action_stop
``` will generate the following code for a WML browser:

```
<p><anchor><go href="url ... ">Pause</go></anchor></p>
<p><anchor><go href="url ... ">Stop</go></anchor></p>
``` and will generate the following source code for a HTML browser:

```
<A HREF="url ... ">Pause</A><BR>
<A HREF="url ... ">Stop</A><BR>
```

In a similar fashion the Content-Type Hypertext Response Header is generated and the output from the HCVM is directed by the DHCI to the appropriate HPS. The HCVM handles the multi-Hypertext generation by being configured by the DHCI which receives the HC-originated Hypertext Request.

The invention claimed is:

1. A method of providing a remote data processing device with control data that enables a user to control the operation of a consumer electronics device, the method comprising:

generating, in the consumer electronic device, a hypermedia data message, the hypermedia data message comprising a command set representing one or more menu options, the menu options corresponding to one or more actions configured to be performed by the consumer electronics device in response to receiving a control message corresponding to one or more of the menu options; and sending the hypermedia data message to the remote data processing device using a hypermedia data communications protocol, wherein the remote data processing device is operable to present the one or more menu options represented by the command set to the user using a man-machine interface, wherein both the remote data processing device and the consumer electronics device are configured to communicate using the hypermedia data communications protocol, and wherein the consumer electronic device is configured to operate in each of a plurality of operational states, the consumer electronic device having a different command set defining one or more actions which it may validly perform when operating in each of said states, and wherein the command set of the hypermedia data message does not comprise commands representing menu options corresponding to actions which may not be validly performed by the consumer electronics device in dependence on the current operational state of the consumer electronics device.

2. The method according to claim 1, further comprising:

generating and sending to the consumer electronics device a hypermedia request message corresponding to selected menu options in response to a user instruction.

3. A method of operating a consumer electronics device using a remote data processing device, the method comprising:

sending a first hypermedia request message from the remote data processing device to the consumer electronics device using a hypermedia data communications protocol;

in response to receiving the first hypermedia request message, the consumer electronic device generating a first hypermedia response message comprising a command set representing one ore more menu options the menu options corresponding to one or more actions configured to be performed by the consumer electronics device; and sending the first hypermedia response message from the consumer electronic device to the remote data processing device using the hypermedia data communications protocol;

in response to receiving the first hypermedia response message, the remote data processing device presenting the one or more menu options represented by the command set to a user via a man-machine interface;

a user of the remote data processing device selecting one of the presented menu options using the man-machine interface;

in response to the user selection, the remote data processing device generating, and sending to the consumer electronics device, a second hypermedia request message; and in response to receiving the second hypermedia request message, the consumer electronics device performing the action corresponding to the selected menu option, and wherein the consumer electronics device is configured to operate in each of a plurality of operational states, the consumer electronics device having a different command set defining one or more actions which it may validly perform when operating in each of said states, and wherein the first hypermedia response message does not comprise commands representing menu options corresponding to actions which may not be validly performed by the consumer electronics device in dependence on the current operational state of the consumer electronics device.

4. The method according to claim 3, further comprising generating the hypermedia data message in two or more hypermedia mark-up languages.

5. An apparatus for providing a remote data processing device with data representing the operational state of a consumer electronics device, the apparatus comprising:

means for generating a hypermedia data message, the hypermedia data message comprising a command set representing one or more menu options, the menu options corresponding to one or more actions configured to be performed by the consumer electronics device in response to receiving a control message corresponding to one or more of the menu options; and means for sending the hypermedia data message to the remote data processing device using a hypermedia data communications protocol, wherein the remote data processing device is operable to present the one or more menu options represented by the command set to the user using a man-machine interface, wherein both the remote data processing device and the consumer electronics device are configured to communicate using the hypermedia data communications protocol, and wherein the consumer electronics device is configured to operate in each of a plurality of operational states, the consumer electronics device having a different command set defining one or more actions which it may validly perform when operating in each of said states, and wherein the command set of the hypermedia data message does not comprise commands representing menu options corresponding to actions which may not be validly performed by the consumer electronics device in dependence on the current operational state of the consumer electronics device.

* * * * *

UNITED STATES PATENT AND TRADEMARK OFFICE
CERTIFICATE OF CORRECTION

PATENT NO.         : 7,565,210 B2
APPLICATION NO. : 11/640804
DATED                  : July 21, 2009
INVENTOR(S)       : Mrsic-Flogel et al.

It is certified that error appears in the above-identified patent and that said Letters Patent is hereby corrected as shown below:

At Column 7, Lines 53-56, delete "FIGS. 3a) and b)..........present invention;" and insert the same on line 54 (Approx.) as a new paragraph.

At Column 10, Line 43, delete "selection." and insert therefore, --selection--.

At Column 14, Line 26, insert --.-- after "etc".

At Column 14, Line 32, delete "Dyamic" and insert therefore, --Dynamic--.

At Column 15, Line 17, delete "via. a DIAC (dedicated inquiry access code)" and insert therefore, --via a DIAC (dedicated inquiry access code).--.

At Column 16, Line 3, delete "stack." and insert therefore, --stack--.

At Column 16, Line 5, delete "i$^2$c" and insert therefore, --I$^2$C--.

At Column 17, Line 29, insert --.-- after "Peripherals".

At Column 20, Line 58, delete "CEDIPLC" and insert therefore, --CED/PLC--.

At Column 21, Lines 32-33, delete "The diagram above the modular system overview of the HCS.".

At Column 23, Line 8, insert --.-- after "bearer)".

At Column 23, Lines 54-55, delete "command ." and insert therefore --command.--.

At Column 25, Lines 59-62, below "detection.", insert --This can be done in two ways: * A HC Menu (such as a mobile phone) is used to display the list of devices. * The HC enters a hypertext browser and submits a Hypertext Request to a local PLC in the HC, that has an embedded server function for proximity device selection, to initiate the device enquiry described above and return a list as a Hypertext Response and be able to act upon it.--.

At Column 27, Line 52, insert --.-- after "section".

At Column 29, Line 25, insert --.-- after "Overview".

At Column 31, Line 38, insert --.-- after "Controller".

At Column 32, Line 38, delete "The figure below shows the system overview.".

At Column 36, Line 37, delete "ore" and insert therefore, --or--.

Signed and Sealed this

Twenty-third Day of February, 2010

David J. Kappos
*Director of the United States Patent and Trademark Office*